United States Patent
Asakura et al.

(10) Patent No.: US 10,771,132 B2
(45) Date of Patent: Sep. 8, 2020

(54) TRANSMITTER, RECEIVER, AND SEMICONDUCTOR CHIP

(71) Applicants: NIPPON HOSO KYOKAI, Shibuya-ku, Tokyo (JP); NHK Engineering System, Inc., Setagaya-ku, Tokyo (JP)

(72) Inventors: Shingo Asakura, Tokyo (JP); Madoka Honda, Tokyo (JP); Kenichi Murayama, Tokyo (JP); Takuya Shitomi, Tokyo (JP); Susumu Saito, Tokyo (JP); Yoshikazu Narikiyo, Tokyo (JP); Hiroaki Miyasaka, Tokyo (JP); Akihiko Satou, Tokyo (JP); Tomoaki Takeuchi, Tokyo (JP); Kenichi Tsuchida, Tokyo (JP); Masahiro Okano, Tokyo (JP); Masayuki Takada, Tokyo (JP); Kazuhiko Shibuya, Tokyo (JP)

(73) Assignees: NIPPON HOSO KYOKAI, Shibuya-ku, Tokyo (JP); NHK Engineering System, Inc., Setagaya-ku, Tokyo (JP)

( * ) Notice: Subject to any disclaimer, the term of this patent is extended or adjusted under 35 U.S.C. 154(b) by 455 days.

(21) Appl. No.: 15/549,221

(22) PCT Filed: Feb. 9, 2016

(86) PCT No.: PCT/JP2016/000676
§ 371 (c)(1),
(2) Date: Aug. 7, 2017

(87) PCT Pub. No.: WO2016/129272
PCT Pub. Date: Aug. 18, 2016

(65) Prior Publication Data
US 2018/0038942 A1 Feb. 8, 2018

(30) Foreign Application Priority Data

Feb. 10, 2015 (JP) .................................. 2015-024655
Jun. 29, 2015 (JP) .................................. 2015-129968

(51) Int. Cl.
*H04B 7/0456* (2017.01)
*H04L 5/00* (2006.01)
(Continued)

(52) U.S. Cl.
CPC ......... *H04B 7/0469* (2013.01); *H04L 5/0016* (2013.01); *H04L 5/023* (2013.01); *H04L 9/0858* (2013.01)

(58) Field of Classification Search
None
See application file for complete search history.

(56) References Cited

U.S. PATENT DOCUMENTS

2009/0323850 A1\* 12/2009 van Nee ........... H03M 13/2757
375/267
2014/0321575 A1 10/2014 Asakura et al.
(Continued)

FOREIGN PATENT DOCUMENTS

JP 2005167499 A 6/2005
JP 2006042342 A 2/2006
(Continued)

OTHER PUBLICATIONS

Aug. 15, 2017, International Preliminary Report on Patentability issued in the International Patent Application No. PCT/JP2018/000676.
(Continued)

*Primary Examiner* — Vladimir Magloire
*Assistant Examiner* — Donald H B Braswell
(74) *Attorney, Agent, or Firm* — Kenja IP Law PC

(57) ABSTRACT

Disclosed is a MIMO system including a transmitter and a receiver, in which an overall BER characteristic is improved. The transmitter (1) maps data, distributed among transmit antennas, onto an IQ plane to generate carrier symbols, and then, applies an inter-polarization interleave processing in a time direction to the carrier symbols between the transmit antennas, to generate OFDM signals. Receiving the OFDM signals, the receiver (2) demodulates the OFDM signals to generate complex baseband signals, and after that, applies a
(Continued)

first deinterleave processing in a time direction to the complex baseband signals to generate time deinterleaved data. Further, the receiver (2) applies a MIMO separation processing to the time deinterleaved data to generate a plurality of sets of MIMO separated data and applies a second deinterleave processing between the receive antennas to the plurality of sets of MIMO separated data, so as to generate carrier symbols.

7 Claims, 15 Drawing Sheets

(51) Int. Cl.
  *H04L 9/08* (2006.01)
  *H04L 5/02* (2006.01)

(56) References Cited

U.S. PATENT DOCUMENTS

| | | | | |
|---|---|---|---|---|
| 2014/0341317 A1* | 11/2014 | Murakami | ........... | H04B 7/0417 375/296 |
| 2015/0110049 A1* | 4/2015 | Pabla | .............. | H01Q 1/38 370/329 |
| 2016/0119081 A1* | 4/2016 | Ouchi | ............... | H04B 7/068 714/776 |

FOREIGN PATENT DOCUMENTS

| | | |
|---|---|---|
| JP | 2008505558 A | 2/2008 |
| JP | 2009278313 A | 11/2009 |
| JP | 2014241475 A | 12/2014 |
| WO | 2008062587 A1 | 5/2008 |
| WO | 2013073195 A1 | 5/2013 |

OTHER PUBLICATIONS

May 14, 2019, Notification of Reasons for Refusal issued by the Japan Patent Office in the corresponding Japanese Patent Application No. 2015-129965.
Susumu Saito et al., Field experiments of 8K Super Hi-Vision transmission using Dual-polarized MIMO and ultra-multilevel OFDM, ITE Technical Report, Feb. 2014, pp. 53-56, vol. 38, No. 8.
Mar. 22, 2016, International Search Report issued in the International Patent Application No. PCT/JP2016/000676.
Association of Radio Industries and Businesses, Transmission System for Digital Terrestrial Television Broadcasting, Mar. 2014, ARIB STD-B31 Version 2.2.
Nov. 19, 2019, Decision of Refusal issued by the Japan Patent Office in the corresponding Japanese Patent Application No. 2015-129965.
Apr. 20, 2020, Office Action issued by the Canadian Intellectual Property Office in the corresponding Canadian Patent Application No. 2,976,191.
Apr. 20, 2020, Office Action issued by the Canadian Intellectual Property Office in the corresponding Canadian Patent Application No. 2,976,197.

* cited by examiner

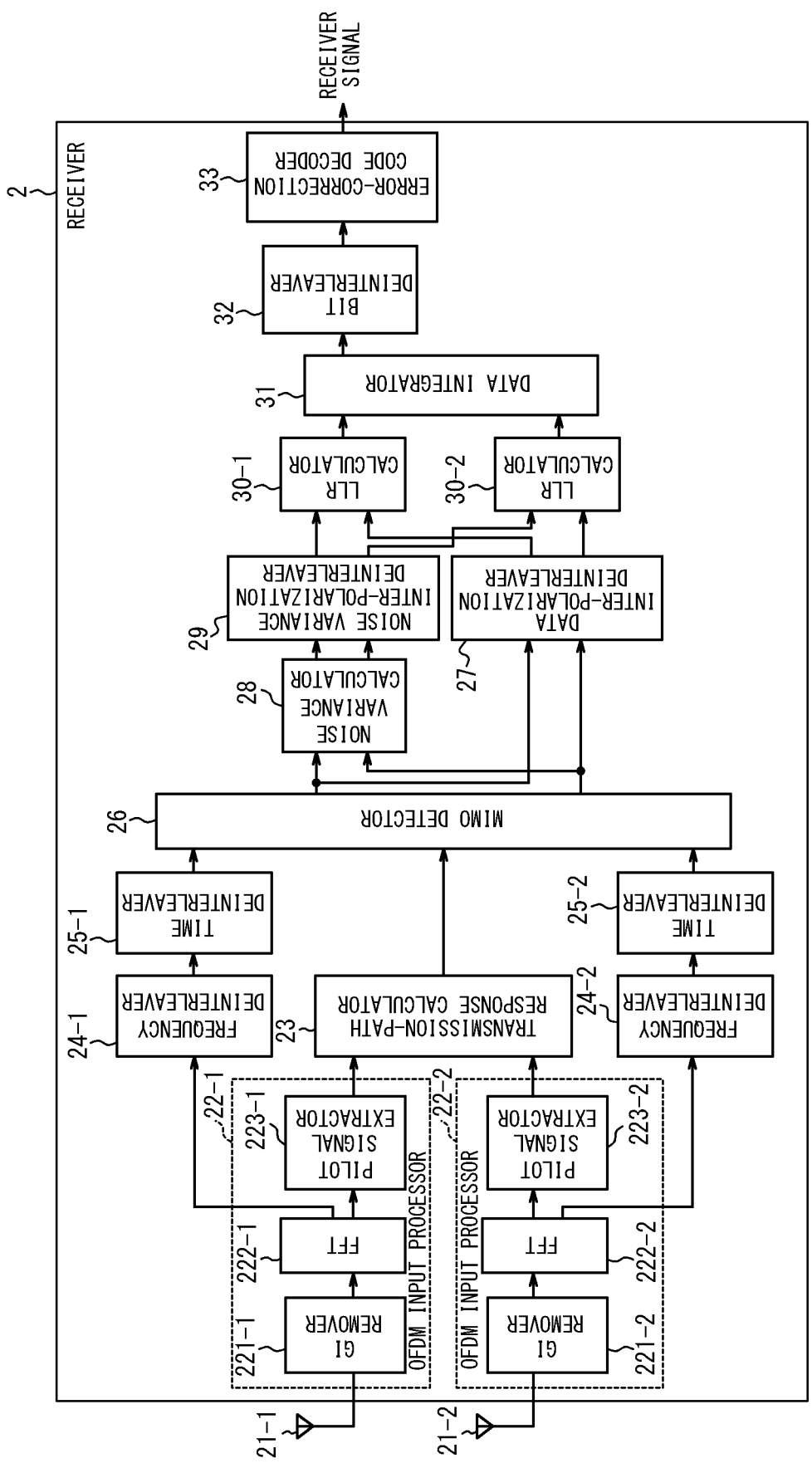

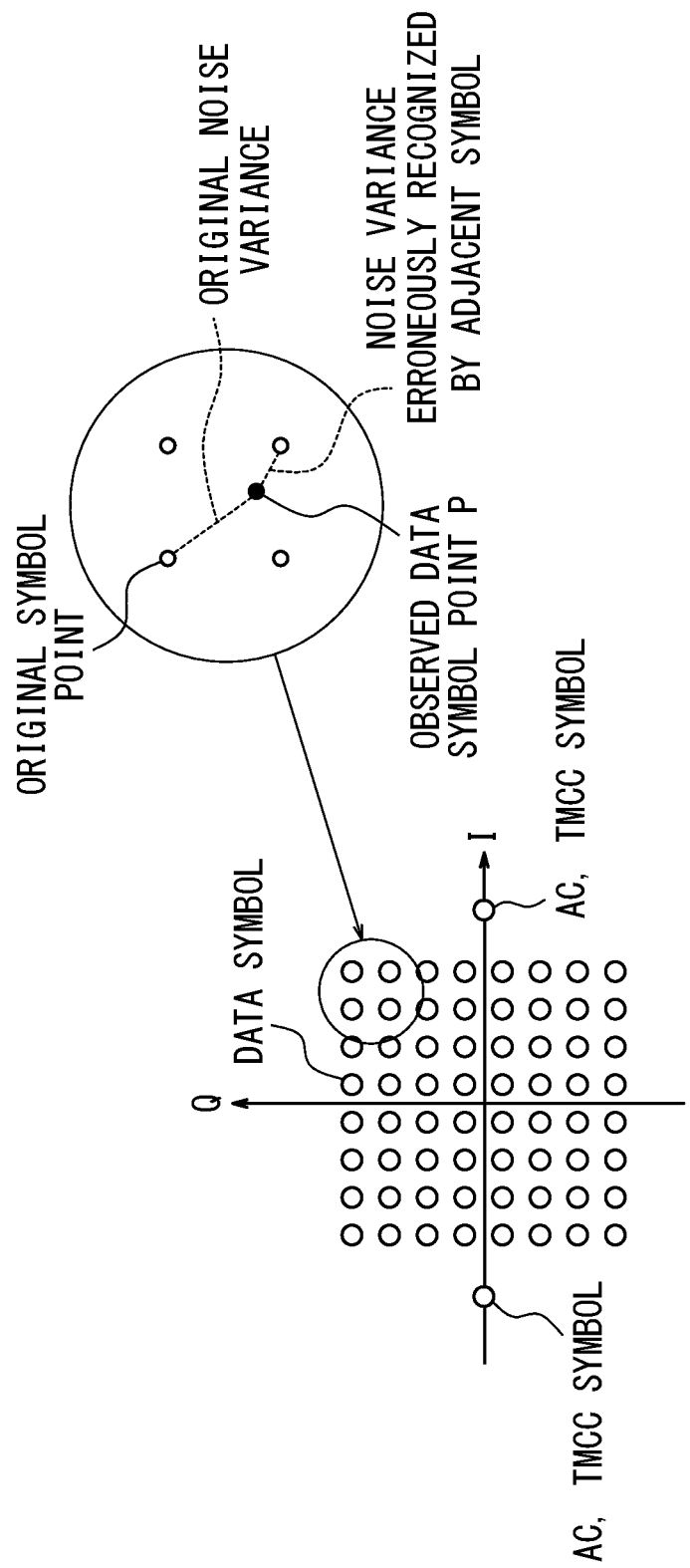

BEFORE INTERLEAVING

INTERLEAVE PROCESSING

AFTER INTERLEAVING

BEFORE INTERLEAVING

INTERLEAVE PROCESSING

AFTER INTERLEAVING

FIG. 8A

BEFORE INTERLEAVING

| 0 | 1 | 2 | ... | 383 |

FIG. 8B

AFTER INTERLEAVING

| k mod 384 | k+1 mod 384 | k+2 mod 384 | ... | k+383 mod 384 | k : SEGMENT NUMBER

FIG. 9A

BEFORE INTERLEAVING

| 0 | 1 | 2 | 3 | 4 | ... | 383 |

FIG. 9B

AFTER INTERLEAVING

| 246 | 190 | 314 | 75 | 383 | ... | 275 |

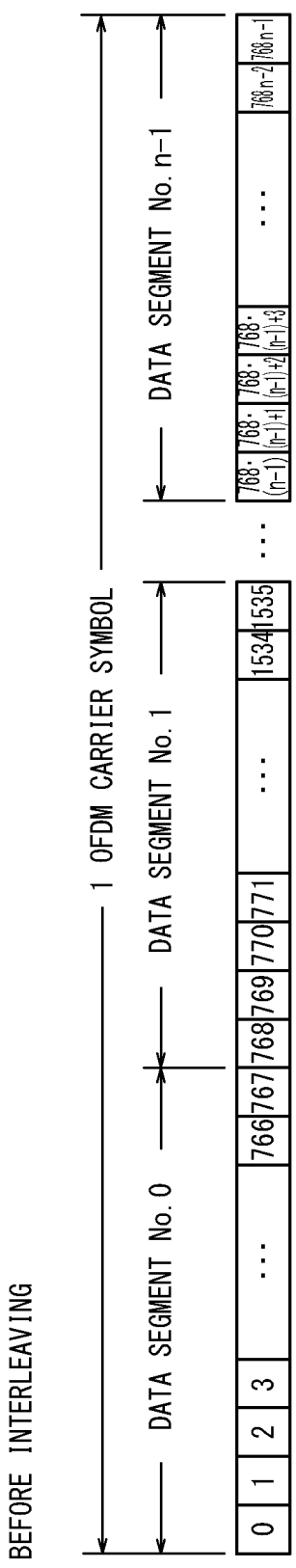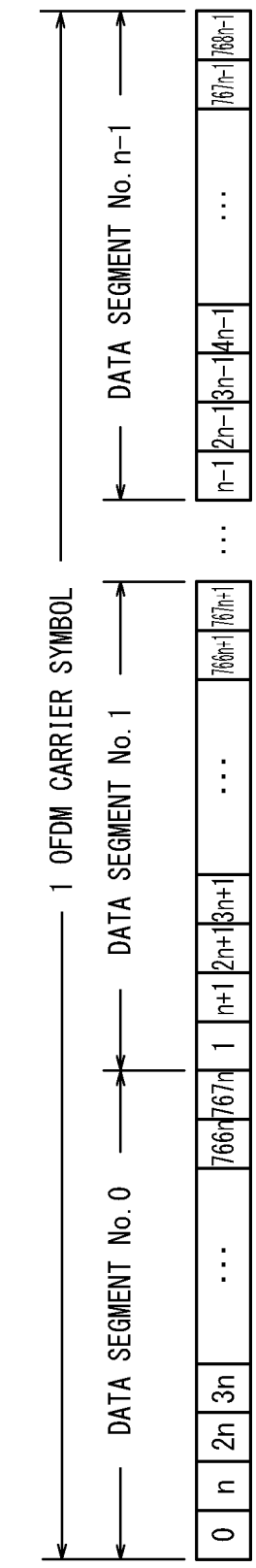

BEFORE INTERLEAVING

|  | ← 1 OFDM CARRIER SYMBOL → |
|---|---|
| INPUT 1 | 0 \| 1 \| 2 \| ... \| N−1 |
| INPUT 2 | N \| N+1 \| N+2 \| ... \| 2N−1 |
| INPUT 3 | 2N \| 2N+1 \| 2N+2 \| ... \| 3N−1 |
| INPUT 4 | 3N \| 3N+1 \| 3N+2 \| ... \| 4N−1 |

INTERLEAVE PROCESSING

WRITE DIRECTION →

| 0 | 1 | 2 | ... | p−1 |
|---|---|---|-----|-----|
| p | p+1 | p+2 | ... | 2p−1 |
| 2p | 2p+1 | 2p+2 | ... | 3p−1 |
| ⋮ | ⋮ | ⋮ | ... | ⋮ |
| (2q−1)p | (2q−1)p+1 | (2q−1)p+2 | ... | 4N−1 |

(width p, height 2q)

READ DIRECTION ↓

AFTER INTERLEAVING

|  | ← 1 OFDM CARRIER SYMBOL → |
|---|---|
| OUTPUT 1 | 0 \| p \| 2p \| ... \|  |
| OUTPUT 2 |  |
| OUTPUT 3 |  |
| OUTPUT 4 | ... \| 4N−1 |

BEFORE INTERLEAVING

INTERLEAVE PROCESSING

AFTER INTERLEAVING

TRANSMITTER, RECEIVER, AND SEMICONDUCTOR CHIP

CROSS REFERENCE TO RELATED APPLICATIONS

This application claims priority from Japanese Patent Applications No. 2015-24655 filed Feb. 10, 2015 and No. 2015-129968 filed Jun. 29, 2015, which are hereby incorporated by reference, as if set forth in full in this document, for all purposes.

TECHNICAL FIELD

The disclosure relates to a transmitter and a receiver, both incorporated in a MIMO (Multiple Input Multiple Output) system using a plurality of individual antennas, and specifically relates to a transmitter and a receiver, which enforce interleaving between transmit antennas and deinterleaving between receive antennas, respectively, in a MIMO system, and a semiconductor chip to be incorporated therein.

BACKGROUND

In recent years, a MIMO system using a plurality of transmit/receive antennas has been proposed as a method for increasing a data transmission capacity in a wireless communication system. The SDM (Space Division Multiplexing) scheme and the STC (Space Time Codes) scheme may be employed in the MIMO transmission system. Further, a proposed example of implementing the MIMO system includes, for example, a dual-polarized MIMO method that simultaneously employs both horizontal and vertical polarizations.

The MIMO transmission using a plurality of transmit/receive antennas may be implemented through an actual transmission path expected to be use for broadcasting services. In such the case, sometimes, a reception level of signals received by only one of the receive antennas has significantly fallen down, due to a difference in reflection characteristics and/or another factor. In the SDM transmission scheme, since the plurality of antennas respectively transmit separate streams, the decrease of the reception level in one of the receive antennas causes the deterioration in the individual BER (Bit Error Rate) characteristic, resulting in a drastic deterioration of an overall BER characteristic of the system as a whole.

In order to improve the performance of the error correction code in the ISDB-T (Integrated Services Digital Broadcasting-Terrestrial) system currently introduced in Japan as the digital terrestrial broadcasting format, a bit interleaving, a time interleaving and a frequency interleaving are employed for rearranging the order of transmission data (for instance, set forth in NPL 1). Further, the interleaving scheme of the IEEE802.11 may be expanded to the MIMO system. In this connection, conventionally known is a technical method for distributing a single stream among a plurality of transmitters in a bit unit so as to implement the bit interleaving in units of each transmitter (for instance, set forth in PTL 1).

CITATION LIST

Patent Literature

PTL 1: JP 2008-505558 A

Non-Patent Literature

NPL 1: "Transmission System for Digital Terrestrial Television Broadcasting", ARIB (Association of Radio Industries and Business), STD-B31

SUMMARY

Technical Problem

In the SDM-MIMO transmission system in which a plurality of antennas (for instance, two antennas) are respectively employed for transmitting separate streams, an overall reception level "R" of the MIMO transmission system employing the two antennas and an overall bit error rate "BER" of the same can be respectively expressed by Equ. 1 and Equ. 2 indicated below. Wherein "$R_1$" refers to the reception level of antenna 1, "$R_2$" refers to the reception level of antenna 2, "$BER_1$" refers to the bit error rate of antenna 1, and "$BER_2$" refers to the bit error rate of antenna 2.

$$R=(R_1+R_2)/2 \quad \text{(Equ. 1)}$$

$$BER=(BER_1+BER_2)/2 \quad \text{(Equ. 2)}$$

In the SDM-MIMO transmission actually practiced in an outdoor environment, characteristics of propagation paths of the radio waves respectively emitted from the plurality of antennas may differ from one another. Accordingly, the signal reception levels of the plurality of antennas may widely differ from each other, depending on the locations thereof. In a case where the deterioration of the bit error rate, caused by the decrease of the signal reception level, only depends on the propagation path, the overall bit error rate of the system also deteriorates according to the Equ. 2 indicated above. In FIG. 15, the solid line represents one of individual BER characteristics respectively corresponding to the receive antennas, while the broken line represents the overall BER acquired by synthesizing the individual BER characteristics. Referring to the difference between the solid and broken lines, the overall BER is apparently deteriorated compared to the individual BER characteristic. Accordingly, in the conventional SDM-MIMO transmission systems, it has been virtually impossible to keep a stable signal reception state, due to the deterioration of the overall BER caused by the differences between the reception levels of the receive antennas. As a result, there arises such a problem that a receivable area becomes narrower than expected.

To overcome the abovementioned drawbacks in conventional MIMO systems, it could be helpful to provide a transmitter, a receiver, and a semiconductor chip, which are to be employed in a MIMO system implementing a SDM-MIMO transmission and make it possible to improve BER characteristics thereof.

Solution to Problem

According to a transmitter reflecting one of the disclosed aspects, the transmitter that generates OFDM signals to be transmitted through a plurality of transmit antennas, comprises: a data distributor that distributes data to the transmit antennas; a mapper that maps the data distributed by the data distributor, onto an IQ plane, and generates carrier symbols to each of which a carrier modulation is applied; an inter-polarization interleaver that applies an inter-polarization interleave processing between the transmit antennas to the carrier symbols, to generate inter-polarization interleaved data; a time interleaver that applies an interleave processing in a time direction to the inter-polarization interleaved data for each of the transmit antennas to generate time interleaved data; and an OFDM output processor that generates the OFDM signals corresponding to the inter-polarization interleaved data.

According to a receiver reflecting another one of the disclosed aspects, the receiver that demodulates OFDM signals received through a plurality of receive antennas, comprises: an OFDM input processor that demodulates the OFDM signals to generate complex baseband signals; a time deinterleaver that applies a first deinterleave processing in a time direction to the complex baseband signals to generate time deinterleaved data; a MIMO detector that applies a MIMO separation processing to the time deinterleaved data to generate a plurality of sets of MIMO separated data; a data inter-polarization deinterleaver that applies a second deinterleave processing between the receive antennas to the plurality of sets of MIMO separated data to generate carrier symbols.

According to a semiconductor chip reflecting still another one of the disclosed aspects, the semiconductor chip that generates OFDM signals to be transmitted through a plurality of transmit antennas, comprises: a data distributor that distributes data to the transmit antennas; a mapper that maps the data distributed by the data distributor, onto an IQ plane, and generates carrier-modulated carrier symbols; an inter-polarization interleaver that applies an inter-polarization interleave processing between the transmit antennas to the carrier symbols, to generate inter-polarization interleaved data; a time interleaver that applies an interleave processing in a time direction to the inter-polarization interleaved data for each of the transmit antennas to generate time interleaved data; and an OFDM output processor that generates the OFDM signals corresponding to the inter-polarization interleaved data.

According to a semiconductor chip reflecting yet another one of the disclosed aspects, the semiconductor chip that demodulates OFDM signals received through a plurality of receive antennas, comprises: an OFDM input processor that demodulates the OFDM signals to generate complex baseband signals; a time deinterleaver that applies a first deinterleave processing in a time direction to the complex baseband signals so as to generate time deinterleaved data; a MIMO detector that applies a MIMO separation processing to the time deinterleaved data so as to generate a plurality of sets of MIMO separated data; a data inter-polarization deinterleaver that rearranges the plurality of sets of MIMO separated data received from the MIMO detector, between the plurality of receive antennas according to a predetermined rule, and thereafter, generates carrier symbols as I data and Q data, wherein the I data and the Q data are adjacent to each other and respectively arranged on an I coordinate axis and a Q coordinate axis on an IQ plane.

Advantageous Effect

The disclosed MIMO system with the SDM-MIMO transmission which enforces inter-polarization interleave processing, to thereby improve the BER characteristic thereof, providing a larger signal receivable area and improved stability of the signal receiving operation.

BRIEF DESCRIPTION OF THE DRAWINGS

In the accompanying drawings:

FIG. 2 is a block diagram illustrating a configuration of the disclosed receiver in accordance with Embodiment 1;

FIG. 3 is an explanatory schematic diagram for explaining the disclosed processing to be performed by a noise variance calculator provided in a receiver in accordance with Embodiment 1;

FIGS. 8A and 8B are explanatory schematic diagrams exemplifying a processing to be performed in a data rotator of a frequency interleaver provided in the disclosed transmitter in accordance with Embodiment 1;

FIGS. 9A and 9B are explanatory schematic diagrams exemplifying a processing to be performed in a data randomizer of a frequency interleaver provided in the disclosed transmitter in accordance with Embodiment 1;

FIGS. 10A and 10B are explanatory schematic diagrams exemplifying a second processing to be performed in an inter segment interleaver of a frequency interleaver provided in the transmitter in accordance with Embodiment 1;

DETAILED DESCRIPTION

Generally speaking, error correction codes can hardly correct sequential errors (burst errors) in data. To make the error correction robust with respect to burst errors, a transmitter applies an interleave processing to original data, while a receiver reconstructs the original data by applying a deinterleave processing to the received data. Namely, since a more uniform distribution of errors in the original data is created, the error correction capability is improved significantly. As aforementioned, the ISDB-T scheme has been introduced in Japan as the digital terrestrial broadcasting format. The ISDB-T scheme is designed to achieve an optimum performance under various kinds of conditions, by applying a bit interleave processing, a frequency interleave processing, and a time interleave processing, respectively. In addition to the interleaving schemes above-cited, we newly introduce an inter transmit-antenna interleave processing to disperse errors in data, caused by the level differences between the transmit antennas, or the like, over the transmit antennas. This can improve the overall transmission characteristic of the MIMO system as a whole. In the following, a concrete example of a dual-polarized MIMO system using the orthogonality between the polarizations will be detailed as an example of the MIMO system employing a plurality of antennas. Needless to say, the scope of the disclosure is not limited to the dual-polarized MIMO transmission, but includes a general-purpose SDM-MIMO transmission as an effective embodiment.

Embodiment 1

A 2×2 MIMO system including two transmit antennas and two receive antennas will be detailed as Embodiment 1. However, the scope of the disclosure is not limited to the above-cited number of antennas.

[Transmitter]

Figure 1:
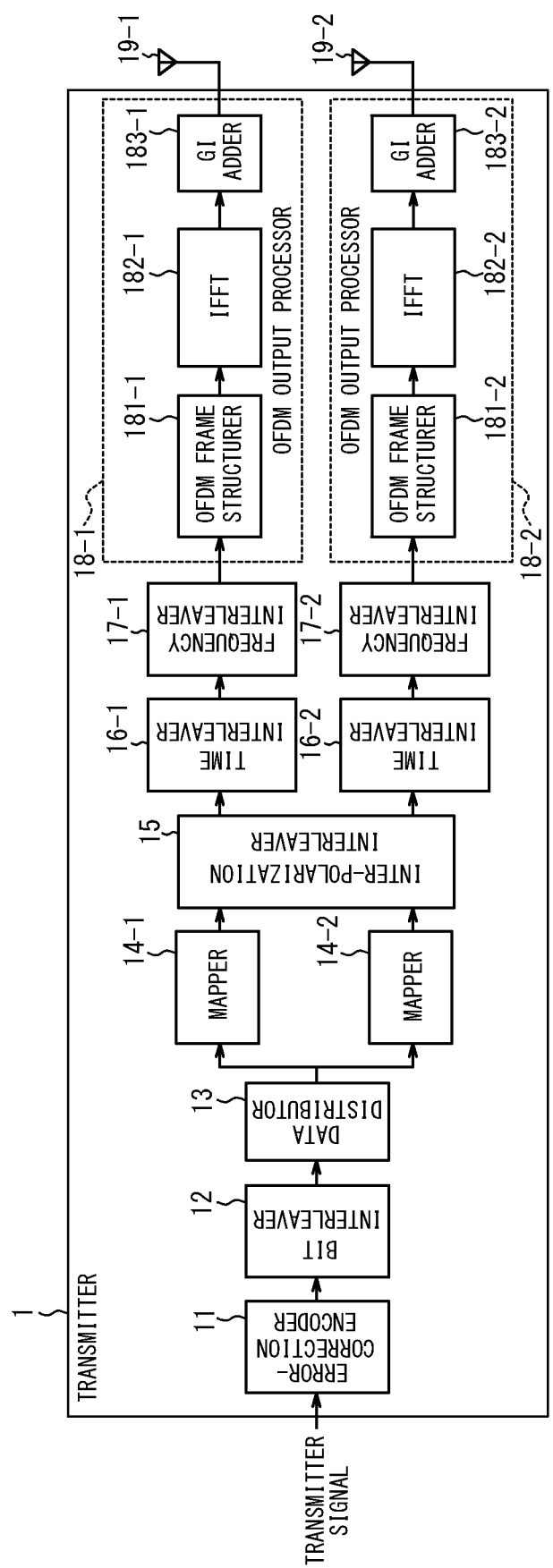
FIG. 1 is a block diagram illustrating a configuration of the disclosed transmitter in accordance with Embodiment 1.

First, the disclosed transmitter in accordance with Embodiment 1 is detailed as follows. The transmitter transmits OFDM (Orthogonal Frequency Division Multiplexing) signals from a plurality of transmit antennas respectively using different polarizations. FIG. 1 is a block diagram illustrating a configuration of the disclosed transmitter 1 in accordance with Embodiment 1. As illustrated in FIG. 1, the transmitter 1 includes an error-correction encoder 11, a bit interleaver 12, a data distributor 13 serving as an antenna stream de-multiplexer, two mappers 14 (14-1 and 14-2), an inter-polarization interleaver 15 serving as a MIMO precoder, two time interleavers 16 (16-1 and 16-2), two frequency interleavers 17 (17-1 and 17-2), and two OFDM output processors 18 (18-1 and 18-2). Further, two transmit antennas 19 (19-1 and 19-2) are coupled to the transmitter 1. The transmitter 1 may include at least a semiconductor chip.

In order to enable the receiver to correct transmission errors, the error-correction encoder 11 applies an error-correction encode processing to transmitter signals to output the error-correction encoded transmitter signals to the bit interleaver 12. For instance, in the above-mentioned error correction encoding, the BCH (Bose-Chaudhuri-Hocquenghem) code is employed for an outer code, while the LDPC (Low Density Parity Check) code is employed for an inner code.

In order to heighten a performance of the error correction code, the bit interleaver 12 interleaves, in units of bit, the error-correction encoded transmit-signals received from the error-correction code encoder 11, and outputs interleaved transmit-signals to the data distributor 13. In a case where the LDPC code is used for an outer code of the error correction encoding, a conventionally known method employed in the DVB-C2 or the like is effective as the bit interleaving method. With respect to the bit interleaving method set forth in the DVB-C2, refer to ETSI EN 302 769 V1.2.1 (p.32) and http://www.dvb.org/technology/dvbc2/.

Receiving the data input from the bit interleaver 12, the data distributor 13 distributes the received data to the mappers 14-1, 14-2, by each prescribed number. Accordingly, the transmitter signals are separated by the number of antennas. For instance, the received data may be distributed to the mappers, with each data corresponding to a single carrier symbol. Concretely speaking, bits corresponding to odd-numbered carrier symbols are outputted to the mapper 14-1 for the transmit antenna 19-1, while other bits corresponding to even-numbered carrier symbols are outputted to the mapper 14-2 for the transmit antenna 19-2.

Receiving the data input from the data distributor 13, the mappers 14 (14-1, 14-2) map the data onto an IQ plane as "m" bits/carrier-symbol to generate carrier symbols (herein, referred to as first carrier symbols) to which the carrier modulation according to the modulation scheme is applied, and output the first carrier symbols to the inter-polarization interleaver 15.

Receiving the first carrier symbols input from the mappers 14-1, 14-2, the inter-polarization interleaver 15 rearranges the order of the first carrier symbols between polarizations corresponding to the transmit antennas so as to generate interleaved data for each of the transmit antennas 19, and outputs the interleaved data (herein, referred to as second carrier symbols) to the time interleavers 16-1, 16-2. The concrete example of inter-polarization interleave processing will be detailed later.

Receiving the second carrier symbols input from the inter-polarization interleaver 15, the time interleavers 16 (16-1, 16-2) rearrange the order of the second carrier symbols in a time direction so as to generate time-interleaved data, and output the time-interleaved data to the frequency interleavers 17 (17-1, 17-2), respectively.

Receiving the time interleaved data input from the time interleavers 16 (16-1, 16-2), the frequency interleavers 17 (17-1, 17-2) further rearrange the order of the time interleaved data in a frequency direction, so as to generate time/frequency interleaved data, and output the time/frequency interleaved data to the OFDM output processors 18 (18-1, 18-2), respectively. For instance, an interleave processing in conformity with the method specified in the ISDB-T may be performed to achieve the interleaving in the frequency direction for each 1 OFDM symbol. A concrete example of the frequency interleave processing will be detailed later.

Receiving the time/frequency interleaved data input from the frequency interleavers 17 (17-1, 17-2), the OFDM output processors 18 (18-1, 18-2) establish OFDM frames with respect to the time/frequency interleaved data, and transmit OFDM signals through the transmit antennas 19 (19-1, 19-2), respectively. In this connection, the OFDM output processor 18-1 processes transmit data to be used for the first polarization, while the OFDM output processor 18-2 processes other transmit data to be used for the second polarization. The first polarization and the second polarization may be defined as a pair of two kinds of separable polarizations, such as a pair of a horizontal polarization and a vertical polarization, a pair of a right rotary polarization and a left rotary polarization, and so on. The OFDM output processors 18 (18-1, 18-2) are provided with OFDM frame structurers 181 (181-1, 181-2), Inverse Fast Fourier Transformers (hereinafter, referred to as IFFTs) 182 (182-1, 182-2), and GI (Guard Interval) adders 183 (183-1, 183-2), respectively.

In each of the OFDM frame structurers 181 (181-1, 181-2), an OFDM frame is established as a block including a predetermined number of OFDM symbols by inserting pilot signals (a SP (Scattered Pilot) signal and a CP (Continual Pilot) signal), a TMCC (Time-Multiplexed Communication Channel) signal representing control information, and an AC (Auxiliary Channel) signal representing additional information, into the time/frequency interleaved data input from corresponding one of the frequency interleavers 17 (17-1, 17-2), with all of the carriers in the frequency direction being defined as 1 OFDM symbol.

The IFFTs 182 (182-1, 182-2) apply the IFFT (Inverse Fast Fourier Transform) processing to the OFDM symbols input from the OFDM frame structurers 181 (181-1, 181-2) to generate effective symbol signals in the time domain.

Receiving the effective symbol signals input from the IFFTs 182 (182-1, 182-2), the GI adders 183 (183-1, 183-2) copy and insert the latter parts of the effective symbol signals to the leading portions of the effective symbol signals as guard intervals, respectively. Then, the OFDM signals to which the orthogonal modulation processing and the D/A (Digital to Analogue) conversion processing are applied, are transmitted outward through the transmit antennas 19 (19-1, 19-2).

The transmit antennas 19 (19-1, 19-2) may be a pair of a horizontal polarization antenna and a vertical polarization antenna, or a pair of a right rotary polarization antenna and a left rotary polarization antenna.

[Receiver]

Next, a receiver in accordance with Embodiment 1 is detailed as follows. The receiver receives the OFDM signals transmitted from the transmitter 1 through a plurality of receive antennas, and then, demodulates the OFDM signals received. FIG. 2 is a block diagram illustrating a configuration of a receiver 2 in accordance with Embodiment 1. As illustrated in FIG. 2, the receiver 2 includes two input processors 22 (22-1 and 22-2), a transmission-path response calculator 23, two frequency deinterleavers 24 (24-1 and 24-2), two time deinterleavers 25 (25-1 and 25-2), a MIMO detector 26, a data inter-polarization deinterleaver 27, a noise variance calculator 28, a noise variance inter-polarization deinterleaver 29, two LLR (Log Likelihood Ratio) calculators 30 (30-1 and 30-2), a data integrator 31, a bit deinterleaver 32, and an error-correction code decoder 33. Further, two receive antennas 21 (21-1 and 21-2) are coupled to the receiver 2. The receiver 2 may include at least a semiconductor chip.

The receive antennas 21 (21-1, 21-2) may be a pair of a horizontal polarization antenna and a vertical polarization antenna, or a pair of a right rotary polarization antenna and a left rotary polarization antenna.

Receiving the OFDM signals transmitted from the transmitter 1 through the receive antennas 21 (21-1, 21-2), the input processors 22 (22-1, 22-2) demodulate the OFDM signals thus received. The IFDM input processors 22 (22-1, 22-2) are provided with GI removers 221 (221-1, 221-2), Fast Fourier Transformers (hereinafter, referred to as FFTs) 222 (222-1, 222-2), and pilot signal extractors 223 (223-1, 223-2), respectively.

The GI removers 221 (221-1, 221-2) apply the orthogonal demodulation processing to the OFDM signals currently received, to generate baseband signals, and generate digital signals by applying the A/D (Analogue to Digital) conversion processing thereto. Then, the GI removers 221 (221-1, 221-2) remove the guard intervals from the digital signals above-generated so as to extract the effective symbol signals therefrom. The extracted effective symbol signals are outputted to the FFTs 222 (222-1, 222-2).

Receiving the effective symbol signals input from the GI removers 221 (221-1, 221-2), the FFTs 222 (222-1, 222-2) apply the FFT (Fast Fourier Transform) processing to the effective symbol signals to generate complex baseband signals, and output the complex baseband signals to both the pilot signal extractors 223 (223-1, 223-2) and the frequency deinterleavers 24 (24-1, 24-2), respectively.

Receiving the complex baseband signals input from the FFTs 222 (222-1, 222-2), the pilot signal extractors 223 (223-1, 223-2) extract the pilot signals including the SP signal and the CP signal, and output the pilot signals to the transmission-path response calculator 23.

The transmission-path response calculator 23 calculates a transmission path response by using the pilot signals received from the pilot signal extractors 223 (223-1, 223-2) and outputs the transmission path response to the MIMO detector 26.

Receiving the complex baseband signals input from the input processors 22 (22-1, 22-2), the frequency deinterleavers 24 (24-1, 24-2) apply a deinterleave processing in the frequency direction to the complex baseband signals above-received. Incidentally, the deinterleave processing in the frequency direction is such an operation for reconstructing the original order of the data that has been rearranged in the frequency direction by the frequency interleavers 17 (17-1, 17-2) in the transmitter 1.

Receiving the frequency deinterleaved data input from the frequency deinterleavers 24 (24-1, 24-2), the time deinterleavers 25 (25-1, 25-2) apply a deinterleave processing in the time direction to the above-received frequency deinterleaved data. Incidentally, the deinterleave processing in the time direction is such an operation for reconstructing the original order of the data that has been rearranged in the time direction by the time interleavers 16 (16-1, 16-2) in the transmitter 1.

Receiving the baseband signals input from the time deinterleavers 25 (25-1, 25-2), the MIMO detector 26 employs the transmission-path response input from the transmission-path response calculator 23, and also employs at least one of currently available methods including the ZF (Zero Forcing), the MMSE (Minimum Mean Square Error), the BLAST (Bell Laboratories Layered Space-Time), the MLD (Maximum Likelihood Detection), etc., to achieve a wave equalization and a MIMO separation in respect to the two polarization signals transmitted from the transmitter 1. Then, the MIMO detector 26 outputs the detected data to the data inter-polarization deinterleaver 27 and the noise variance calculator 28.

Receiving the data from the MIMO detector 26, the data inter-polarization deinterleaver 27 applies a deinterleave processing between the polarizations (between the receive antennas) to the data, and outputs the deinterleaved data to the LLR calculators 30 (30-1, 30-2). Incidentally, the deinterleave processing between the polarizations is such an operation for reconstructing the original order of the data from the rearranged order of the data interleaved between the polarizations by the inter-polarization interleaver 15 in the transmitter 1.

The noise variance calculator 28 determines an average noise variance from each of the polarization signals input from the MIMO detector 26, and outputs the average noise variance to the noise variance inter-polarization deinterleaver 29. The noise variance $\sigma^2$ represents the deviation between a symbol point on the IQ coordinate, at which the carrier symbol should reside originally, and another symbol point P actually observed. For instance, the noise variance $\sigma^2$ can be calculated by determining the modulation error ratio and taking a reciprocal thereof.

FIG. 3 is an explanatory schematic diagram for explaining the processing to be performed by the noise variance calculator 28. Several calculating methods may be available for calculating the noise variance. As illustrated in FIG. 3, however, in a case of calculating the noise variance at the symbol point P, the noise variance obtained based on at least one of the AC symbol and the TMCC symbol is less susceptible to erroneous recognition, as compared with the noise variance obtained as being directly calculated from the data symbol modulated by the multilevel modulation scheme such as the 64QAM (sixty four Quadrature Amplitude Modulation), as exemplified in FIG. 3. Accordingly, the noise variance calculator 28 may suitably calculate the average noise variance of the total OFDM carrier symbols by employing at least one of the AC symbol and the TMCC symbol.

When the transmission path has a multi-transmission path, the noise variance varies due to differences in electric power of the OFDM carriers. Since the noise variance $\sigma^2$ is necessary for calculating the LLR (Log Likelihood Ratio) in units of bit constituting the each carrier symbol, the performance of the LDPC decoding is determined by calculating the noise variance for each carrier as accurately as possible. Accordingly, the weight matrix obtained from the transmission-path response is utilized for weighting each carrier with respect to the average noise variance of the entire bandwidth to determine the noise variance. It is conventionally known that the weighting matrix in each carrier can be represented by $(H^H H)^{-1}$ as a transmission-path response matrix H. The weight component of each carrier can be represented by the diagonal component of the transmission-path response matrix H. Weighting is achieved by normalizing the diagonal components above-mentioned all over the carriers and multiplying the average noise variance of the entire bandwidth by the diagonal components thus normalized. For instance, with respect to the decoding method in which information in regard to each carrier signal versus electric power (=C/N) and the likelihood calculation result are multiplied, Nakahara sets forth a paper entitled "A Study on soft decision decoding of 64QAM modulated OFDM signals under multi path distortion" in ITE Technical Report vol. 22, no. 34, PP1-6, June 1998. Further, with respect to details of the weight matrix calculation, for instance, refer to Page 101 of the book entitled "Easily Understandable MIMO System Technology" authored by Ogane and Ogawa, published by Ohmusha Ltd.

Receiving the noise variance corresponding to each of the polarization signals input from the noise variance calculator 28, the noise variance inter-polarization deinterleaver 29 applies deinterleave processing (rearrangement processing inverse to that applied by the inter-polarization interleaver 15 in the transmitter 1) to the noise variance above-received and outputs the deinterleaved noise variance to the LLR calculators 30 (30-1, 30-2). The noise variance necessary for calculating the LLR may be similarly deinterleaved, to thereby reflect a different noise variance caused by the difference between the transmission paths of the plurality of antennas, to the LLR. As a result, the LLR calculators 30 (30-1, 30-2) can calculate the LLR more accurately than ever, making full use of the improving effect in the error-correction code decoder 33.

Receiving the deinterleaved data input from the data inter-polarization deinterleaver 27 and the noise variance $\sigma^2$ corresponding to the deinterleaved data concerned, from the noise variance inter-polarization deinterleaver 29, the LLR calculators 30 (30-1, 30-2) calculate the LLR by using both the deinterleaved data and the noise variance $\sigma^2$, and output the calculated LLRs to the data integrator 31. For instance, assuming the observed value as "y", since the provability "P" (=Likelihood Function) of respective binary values (x=0, 1) exhibits a Gaussian distribution, the LLR in the BPSK (Binary Phase Shift Keying) is represented by the Equ. 3 indicated below. For instance, details of the above-mentioned are set forth in the book entitled "Introduction to Low Density Parity Check Code and the Sum-Product Algorithm" authored by Wadayama, published by Triceps Ltd.

$$LLR = \ln\frac{P(y \mid x=0)}{P(y \mid x=1)} \quad \text{(Equ. 3)}$$

$$= \ln\left[\frac{1/(\sqrt{2\pi\sigma^2})\exp(-(y-1)^2/(2\sigma^2))}{1/(\sqrt{2\pi\sigma^2})\exp(-(y+1)^2/(2\sigma^2))}\right]$$

$$= 2y/\sigma^2$$

The data integrator 31 integrates the LLRs, calculated by the LLR calculators 30 (30-1 and 30-2) in respect to respective bits (integration processing inverse to the distribution processing applied by the data distributor 13 in the transmitter 1), and outputs the integrated LLRs to the bit deinterleaver 32.

Receiving the integrated LLRs input from the data integrator 31, the bit deinterleaver 32 applies a deinterleave processing to the LLR corresponding to each bit. Incidentally, the above-identified deinterleave processing is such an operation for reconstructing the original order of the data from the rearranged order of the data bit-interleaved by the bit interleaver 12 in the transmitter 1.

Receiving the deinterleaved LLR input from the bit deinterleaver 32, the error-correction code decoder 33 executes the LDPC decoding operation using the deinterleaved LLR, and further executes the BCH decoding operation to decode the signals transmitted from the transmitter 1.

In this connection, in the transmitter 1, the order of processing to be implemented by the time interleavers 16 (16-1, 16-2) and the frequency interleavers 17 (17-1, 17-2) may be reversed. Namely, the frequency interleave processing may be made to precede the time-interleave processing. In that case, in the receiver 2, the order of processing to be implemented by the frequency deinterleavers 24 (24-1, 24-2) and the time deinterleavers 25 (25-1, 25-2) may be reversed as well. Namely, the time deinterleave processing may be made to precede the frequency deinterleave processing.

Alternatively, in the transmitter 1, the inter-polarization interleave processing and the frequency interleave processing may be implemented simultaneously, and after that, the time interleave processing may be implemented. In that case, similarly in the receiver 2, the time deinterleave processing is completed at first, and thereafter, the inter-polarization deinterleave processing and the frequency deinterleave processing are implemented simultaneously.

[Inter-Polarization Interleaver]

Next, the processing to be performed by the inter-polarization interleaver 15 will be detailed in the following. Incidentally, with respect to the rearranged order of the data interleaved by applying the interleave processing, the scope of the disclosure is not limited to Examples described below.

Example 1 of Inter-Polarization Interleave Processing

Figure 4A:
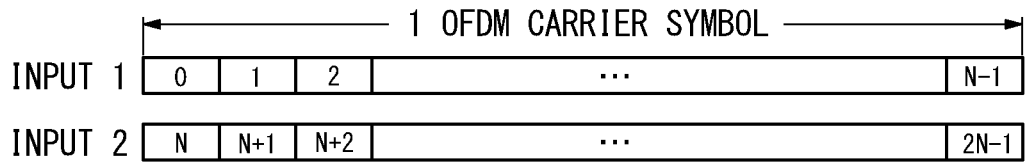
FIGS. 4A, 4B, and 4C are explanatory schematic diagrams exemplifying a first processing to be implemented in an inter-polarization interleaver provided in the disclosed transmitter in accordance with Embodiment 1.
Figure 4B:
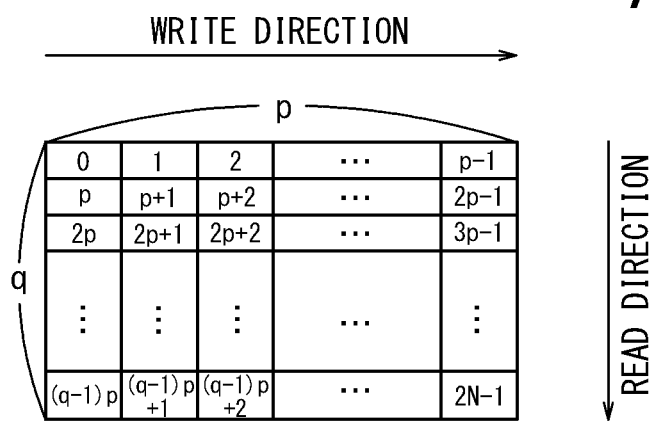
Figure 4C:
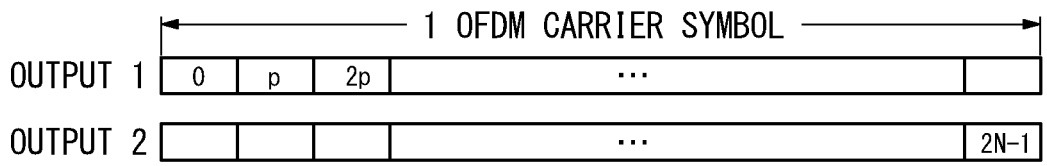

FIGS. 4A, 4B, 4C are explanatory schematic diagrams illustrating an exemplified interleave processing to be implemented in the inter-polarization interleaver 15. In Example 1, for each one of OFDM carrier symbols corresponding to the number of transmit antennas, the order of carrier symbols is rearranged on a carrier symbol basis according to the predetermined rule. Assuming that the number of carrier symbols included in 1 OFDM carrier symbol is "N", the inter-polarization interleaver 15 receives carrier symbols input from the mapper 14-1, the carrier symbols respectively having the carrier symbol numbers of "0" through "N-1", and also receives carrier symbols input from the mapper 14-2, the carrier symbols respectively having the carrier symbol numbers of "N" through "2N-1". In Example 1, the inter-polarization interleaver 15 writes each one line having "p" pieces of carrier symbols in the line direction, and after that, reads each one column of carrier symbols having "q" pieces of carrier symbols in the column direction. Wherein, p×q=2N is established.

As well as the above, with respect to the OFDM carrier symbols corresponding to the number of transmit antennas, the inter-polarization interleaver 15 may be provided in advance with a table (regulatory table) in which the positions of carrier symbols before the rearrangement are correlated to those after the rearrangement, according to a predetermined rule. In that case, the inter-polarization interleaver 15 receives carrier symbols input from the mapper 14-1, the carrier symbols respectively having the carrier symbol numbers of "0" through "N-1", and also receives carrier symbols input from the mapper 14-2, the carrier symbols respectively having the carrier symbol numbers of "N" through "2N-1". Then, referring to the regulatory table, the inter-polarization interleaver 15 rearranges the received carrier symbols for every "2N" carrier symbols.

Example 2 of Inter-Polarization Interleave Processing

Figure 5A:
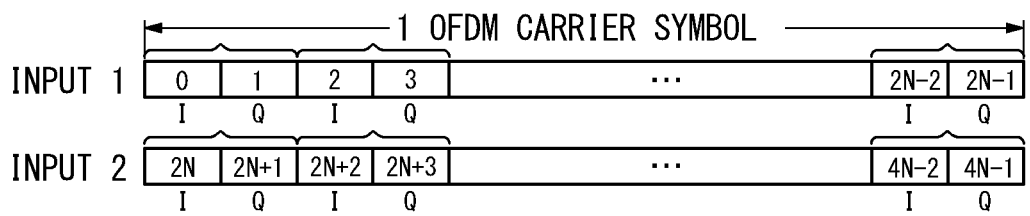
FIGS. 5A, 5B, and 5C are explanatory schematic diagrams exemplifying a second processing to be performed in the disclosed inter-polarization interleaver provided in the disclosed transmitter in accordance with Embodiment 1.
Figure 5B:
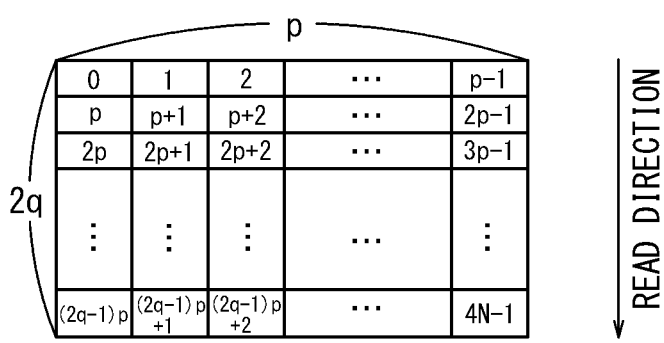
Figure 5C:
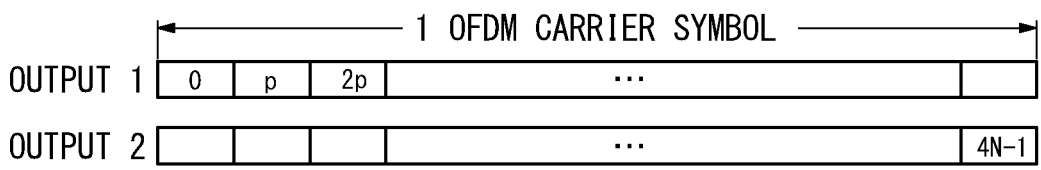

Successively, Example 2 of inter-polarization interleave processing will be detailed in the following. FIGS. 5A, 5B, 5C are explanatory schematic diagrams illustrating Example 2 of inter-polarization interleave processing to be performed in the inter-polarization interleaver 15. As aforementioned in Example 1, for each one of OFDM carrier symbols corresponding to the number of transmit antennas, the order of carrier symbols is rearranged on a carrier symbol basis according to the predetermined rule. Whereas, in Example 2, for each one of OFDM carrier symbols corresponding to the number of transmit antennas, the order of carrier symbols is rearranged in units of data to be positioned on the I coordinate axis of the IQ plane (hereinafter, referred to as I data) and in units of data to be positioned on the Q coordinate axis of IQ plane (hereinafter, referred to as Q data) according to the predetermined rule.

Concretely speaking in Example 2, assuming that the number of carrier symbols is "N", the inter-polarization interleaver 15 receives carrier symbols from the mapper 14-1, the carrier symbols respectively having the carrier symbol numbers of "0" through "N-1". Then, the inter-polarization interleaver 15 decomposes the received carrier symbols into I data and Q data, which are defined as I data or Q data respectively having data numbers of "0" through "2N-1" (hereinafter, referred to as IQ data). As well as the above, the inter-polarization interleaver 15 receives carrier symbols from the mapper 14-2, the carrier symbols respectively having the carrier symbol numbers of "N" through "2N-1". Then, the inter-polarization interleaver 15 decomposes the received carrier symbols into I data and Q data, which are defined as IQ data respectively having data numbers of "2N" through "4N-1". Successively, the inter-polarization interleaver 15 writes each one line having "p" pieces of the IQ data in the line direction, and after that, reads each one column of the IQ data having "2q" pieces of carrier symbols in the column direction. After interleaving, new carrier symbols (pairs of I data and Q data) are created. Wherein, p×2q=4N is established.

In the same way, with respect to the OFDM carrier symbols corresponding to the number of transmit antennas, the inter-polarization interleaver 15 may be provided in advance with a table (regulatory table) in which the positions of IQ data before the rearrangement are correlated to those after the rearrangement, according to a predetermined rule. In that case, the inter-polarization interleaver 15 receives carrier symbols input from the mapper 14-1, the carrier symbols respectively having the carrier symbol numbers of "0" through "N-1", and decomposes the received carrier symbols into I data and Q data to create IQ data respectively having data numbers of "N" through "2N-1". As well as the above, the inter-polarization interleaver 15 also receives carrier symbols input from the mapper 14-2, the carrier symbols respectively having the carrier symbol numbers of "N" through "2N-1", and decomposes the received carrier symbols into I data and Q data to create IQ data respectively having data numbers of "2N" through "4N-1". Then, referring to the regulatory table, the inter-polarization interleaver 15 rearranges every IQ data of total "4N" IQ data.

Example 3 of Inter-Polarization Interleave Processing

Still successively, Example 3 of inter-polarization interleave processing is detailed as follows. In Example 3, with respect to the OFDM carrier symbols corresponding to the number of transmit antennas, the inter-polarization interleaver 15 is provided in advance with a table (randomization table) in which the positions of carrier symbols before the rearrangement are randomly correlated to those after the rearrangement. In that case, the inter-polarization interleaver 15 receives carrier symbols input from the mapper 14-1, the carrier symbols respectively having the carrier symbol numbers of "0" through "N-1", and also receives carrier symbols input from the mapper 14-2, the carrier symbols respectively having the carrier symbol numbers of "N" through "2N-1". Then, referring to the randomization table, the inter-polarization interleaver 15 rearranges the received carrier symbols for every "2N" carrier symbols.

Example 4 of Inter-Polarization Interleave Processing

Yet successively, Example 4 of inter-polarization interleave processing is detailed as follows. As aforementioned in Example 3, for each one of OFDM carrier symbols corresponding to the number of transmit antennas, the order of carrier symbols is randomly rearranged on a carrier symbol basis. Whereas, in Example 4, for each one of OFDM carrier symbols corresponding to the number of transmit antennas, the order of carrier symbols is randomly rearranged in units of IQ data.

Concretely speaking, in Example 4, with respect to the OFDM carrier symbols corresponding to the number of transmit antennas, the inter-polarization interleaver 15 is provided in advance with a table (randomization table) in which the positions of IQ data before the rearrangement are randomly correlated to those after the rearrangement. The inter-polarization interleaver 15 receives carrier symbols input from the mapper 14-1, the carrier symbols respectively having the carrier symbol numbers of "0" through "N−1". Then, the inter-polarization interleaver 15 decomposes the received carrier symbols into I data and Q data, which are defined as IQ data respectively having data numbers of "0" through "2N−1". As well as the above, the inter-polarization interleaver 15 receives carrier symbols input from the mapper 14-2, the carrier symbols respectively having the carrier symbol numbers of "N" through "2N−1". Then, the inter-polarization interleaver 15 decomposes the received carrier symbols into I data and Q data, which are defined as IQ data respectively having data numbers of "2N" through "4N−1". Successively, referring to the randomization table, the inter-polarization interleaver 15 rearranges the IQ data for every "4N" IQ data. After interleaving, new carrier symbols (pairs of I data and Q data) are created.

Incidentally, in Example 3 or 4 of the inter-polarization interleave processing, which are capable of excluding a periodicity only by applying a single processing and render a favorable BER characteristic, the processing requires a specific table and cannot be enforced according to a predetermined rule, thus increasing a burden when implemented in hardware.

Further, in the aforementioned Examples of the inter-polarization interleave processing, the inter-polarization interleaver 15 rearranges carrier symbols or IQ data in units of a carrier symbol or IQ data for each one of OFDM carrier symbols corresponding to the number of transmit antennas. However, the inter-polarization interleaver 15 may rearrange carrier symbols or IQ data in units of a carrier symbol or IQ data for each one of any numbers of carrier symbols.

Still further, in Example 2 or 4, when rearranging the carrier symbols in units of IQ data, the inter-polarization interleaver 15 may rearrange only one of I data and Q data.

On the other hand, the data inter-polarization deinterleaver 27 rearranges the order of the data MIMO-separated by the MIMO detector 26 in the direction reverse to that of the inter-polarization interleaver 15 so as to reconstruct the original order of the data. For instance, in the case where the inter-polarization interleaver 15 applies the interleave processing described in Example 1 aforementioned, the data inter-polarization deinterleaver 27 writes every one line having "q" units of data in the line direction, and after that, reads every one column of the data having "p" units of data in the column direction. While, in the case where the inter-polarization interleaver 15 applies the interleave processing described in Example 2 aforementioned, the data inter-polarization deinterleaver 27 writes every one line having "2q" units of data in the line direction, and after that, reads every one column of the data having "p" units of data in the column direction. Further, in the case where the inter-polarization interleaver 15 applies the interleave processing while using any one of the tables (regulatory table or randomization table), the data inter-polarization deinterleaver 27 refers to a table in which positions before the rearrangement and those after the rearrangement are exchanged with each other in the table concerned, to perform the rearrangement processing.

Further, in the case where the inter-polarization interleaver 15 rearranges only one of I data and Q data in Example 2 or 4 aforementioned, the data inter-polarization deinterleaver 27 rearranges only corresponding one of odd numbered data and even numbered data.

Still further, in the case where the inter-polarization interleaver 15 performs the inter-polarization interleave processing according to Example 2 or 4 aforementioned, the data inter-polarization deinterleaver 27 applies the inter-polarization deinterleave processing to the MIMO-separated data received from the MIMO detector 26, and thereafter, generates carrier symbols as I data and Q data. Wherein, the I data and the Q data are adjacent to each other and respectively arranged on the I coordinate axis and the Q coordinate axis on the IQ plane.

Yet further, as well as the data inter-polarization deinterleaver 27, the noise variance inter-polarization deinterleaver 29 rearranges the noise variance received from the noise variance calculator 28 in a direction reverse to that in the inter-polarization interleaver 15.

[Frequency Interleaver]

Figure 6:
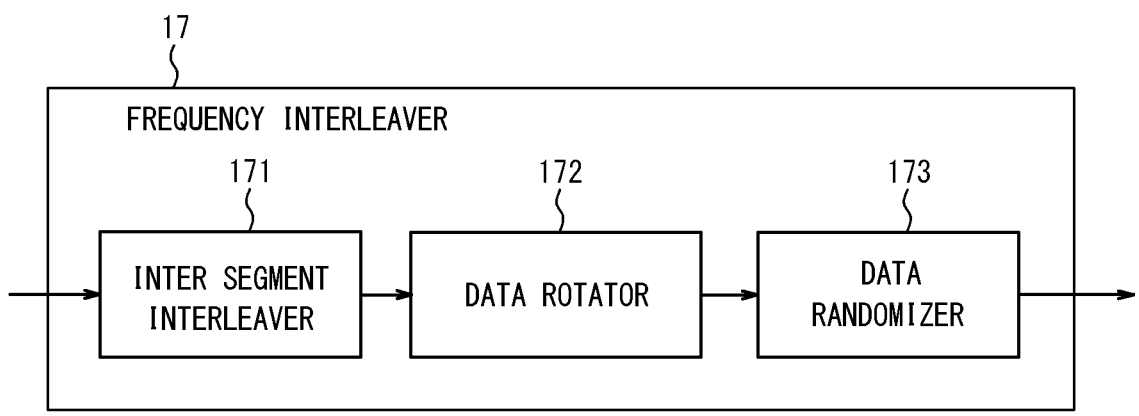
FIG. 6 is a schematic diagram illustrating an exemplary configuration of a frequency interleaver provided in the disclosed transmitter in accordance with Embodiment 1 disclosed herein.

Next, processing of the frequency interleavers 17 (17-1, 17-2) will be detailed in the following. Incidentally, since the frequency deinterleavers 24 (24-1, 24-2) rearrange the interleaved order of the data in a direction reverse to that in the frequency interleavers 17 (17-1, 17-2) to reconstruct the original order of the data, explanations therefore are omitted. FIG. 6 is a schematic diagram illustrating an exemplified configuration of each of the frequency interleavers 17 (17-1, 17-2). Since the configurations of the frequency interleavers 17 (17-1, 17-2) are identical to each other, hereinafter, only the frequency interleaver 17-1 will be detailed. The frequency interleaver 17 includes an inter segment interleaver 171, a data rotator 172, and a data randomizer 173. In this connection, since the inter-polarization interleaver 15 virtually serves as the inter segment interleaver 171, the inter segment interleaver 171 may be omitted.

Example 1 of Frequency Interleave Processing

In a case where the inter-polarization interleaver 15 performs the inter-polarization interleave processing in accordance with Example 1 or 3 aforementioned, the processing to be performed in the frequency interleaver 17 will be detailed as Example 1 of frequency interleave processing.

Figure 7A:
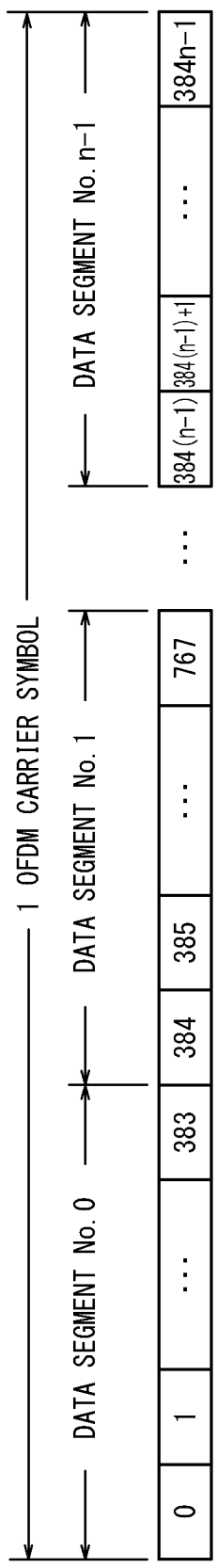
FIGS. 7A and 7B are explanatory schematic diagrams exemplifying a first processing to be performed in an inter-segment interleaver of a frequency interleaver provided in the disclosed transmitter in accordance with Embodiment 1.
Figure 7B:
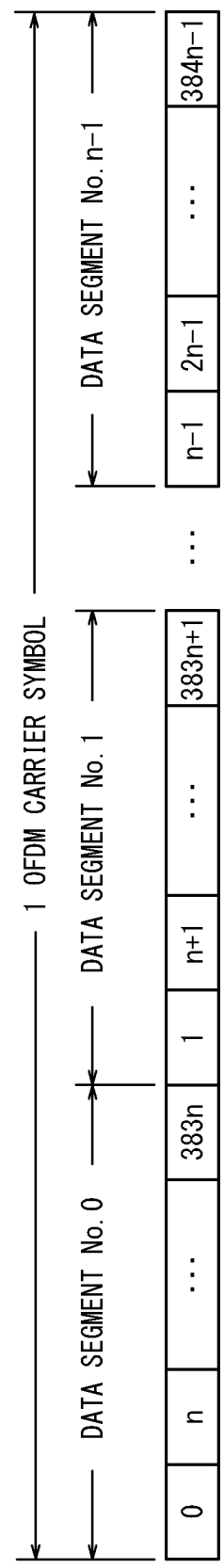

FIGS. 7A, 7B are explanatory schematic diagrams illustrating an exemplified processing to be performed in the inter segment interleaver 171. FIG. 7A illustrates an arrangement of symbols before interleaving, while FIG. 7B illustrates another arrangement of symbols after interleaving. Receiving carrier symbols from the time interleaver 16-1, the inter segment interleaver 171 applies the interleave processing between segments to the carrier symbols along a frequency direction for every 1 OFDM carrier symbol. In the example shown in FIG. 7A, the number of segments included in 1 OFDM carrier symbol is set at "n" (n=13, in the ISDB-T format), while the number of carrier symbols included in 1 segment is set at 384. In this connection, the exemplified rearrangement order is merely an example among various modifications thereof. Accordingly, the scope of the disclosure is not limited thereby.

FIGS. 8A, 8B are explanatory schematic diagrams illustrating an exemplified data-rotation interleave processing to be performed in the data rotator 172. FIG. 8A illustrates an arrangement of symbols before interleaving, while FIG. 8B illustrates another arrangement of symbols after interleaving. As well as FIGS. 7A, 7B, the number of carrier symbols included in 1 segment is set at 384. Receiving the carrier symbols input from the inter segment interleaver 171, the data rotator 172 interleaves the received carrier symbols by applying the data rotation processing thereto for each 1 segment. The data rotator 172 rearranges "i" numbered data included in "k" numbered segment to "i'" numbered data included in "k" numbered segment through the data rotation processing. In the example illustrated in FIGS. 8A, 8B, =(i+k) mod 384 is established. In this connection, the exemplified rearrangement order is merely an example among various modifications thereof. Accordingly, the scope of the disclosure is not limited thereby.

FIGS. 9A, 9B are explanatory schematic diagrams illustrating an exemplified randomization interleave processing to be performed in the data randomizer 173. FIG. 9A illustrates an arrangement of symbols before interleaving, while FIG. 9B illustrates another arrangement of symbols after interleaving. As well as FIGS. 7A, 7B, 8A, 8B, the number of carrier symbols included in 1 segment is set at 384. The data randomizer 173 is provided in advance with a randomization table corresponding to the number of carrier symbols included in the segment, wherein the randomization tables respectively provided in the transmitter and the receiver are identical to each other. Receiving the data input from the data rotator 172, the data randomizer 173 applies the randomization processing to the received data while referring to the randomization table so as to eliminate the periodicity of the data concerned. In this connection, the exemplified set of random numbers is merely an example among various modifications thereof. Accordingly, the scope of the disclosure is not limited thereby. Further, the rearrangement methods, respectively employed in the inter segment interleaver 171, the data rotator 172 and the data randomizer 173, may differ between the frequency interleavers 17-1, 17-2.

Example 2 of Frequency Interleave Processing

Next, in a case where the inter-polarization interleaver 15 performs the inter-polarization interleave processing in accordance with Example 2 or 4 aforementioned, the processing to be performed in the frequency interleaver 17-1 will be detailed as Example 2 of the frequency interleave processing.

FIGS. 10A, 10B are explanatory schematic diagrams illustrating an exemplified frequency-interleave processing to be performed in the inter segment interleaver 171. FIG. 10A illustrates an arrangement of I data or Q data before interleaving, while FIG. 10B illustrates another arrangement of IQ data after interleaving. Receiving IQ data from the time interleaver 16-1, the inter segment interleaver 171 applies the interleave processing between segments to the IQ data along the frequency direction for every 1 OFDM carrier symbol. In the example shown in FIG. 10A, the number of segments included in 1 OFDM carrier symbol is set at "n" (n=13, in the ISDB-T format), while the number of carrier symbols included in 1 segment is set at 384 (namely, the number of IQ data is 768). The inter segment interleaver 171 rearranges the data in units of IQ data, instead of a unit of carrier symbol. In this connection, the exemplified rearrangement order is merely an example among various modifications thereof. Accordingly, the scope of the disclosure is not limited thereby.

As well as Example 1, receiving the IQ data from the inter segment interleaver 171, the data rotator 172 interleaves the received carrier symbols by applying the data rotation processing thereto for each 1 segment. Further, the data randomizer 173 is provided in advance with a randomization table corresponding to the number of carrier symbols included in the segment, wherein the randomization tables are respectively provided in the transmitter and the receiver. Successively, receiving the carrier symbols from the data rotator 172, the data randomizer 173 randomly rearranges the received carrier symbols while referring to the randomization table so as to eliminate the periodicity of the carrier symbols concerned.

Incidentally, in Example 3 and Example 4 of the inter-polarization interleave processing, since the periodicity in the frequency direction can be also eliminated by employing the randomized table provided in the inter-polarization interleaver 15, the frequency interleaver 17 (17-1) can be omitted. In that case, the frequency deinterleavers 24 (24-1, 24-2) included in the receiver 2 may be omitted as well.

As described in the foregoing, the transmitter 1 employs the inter-polarization interleaver 15 to rearrange the order of the carrier symbols between the polarizations so as to generate the interleaved data for each one of the transmit antennas 19 (19-1, 19-2). While, the receiver 2 employs the data inter-polarization deinterleaver 27 and the noise variance inter-polarization deinterleaver 29 for applying the deinterleave processing between the polarizations to the interleaved data received from the transmitter 1. Thus, according to the pair of the transmitter 1 and the receiver 2 of Embodiment 1, even when the reception levels are different between a plurality of polarizations, a lot of erroneous data included in any one of the polarizations can be dispersed effectively, which improves the performance of the error correction code, resulting in an improvement of the BER characteristic.

Further, the transmitter 1 divides the data into a plurality of sets of data respectively corresponding to the plurality of transmit antennas and applies the inter-polarization interleave processing to the divided data before applying the time interleave processing and the frequency interleave processing, instead of after applying the time interleave processing and the frequency interleave processing. On the other hand, the order of the processing to be conducted in the receiver 2 is equivalent to the reverse order of the processing to be conducted in the transmitter 1. Accordingly, after receiving the signals from the transmitter 1, the receiver 2 conducts the OFDM demodulation processing, the frequency deinterleave processing, the time deinterleave processing, the MIMO detection processing, and so on, in this order. In this connection, when repeated enforcements of demodulation and decode, such as turbo equalization processing or the like, are required within the receiver 2, sometimes, repeated processing may be enforced while inputting the decoded results into the MIMO detector 26 and the LLR calculators 30-1, 30-2. In that case, if the repeated processing includes the time deinterleaver, the time interleave processing should be applied anew every time when the decoded result is inputted, resulting in increase of the scale of the processing circuits thereof. To solve the problem above-mentioned, the time deinterleavers 25 (25-1, 25-2) are disposed before the MIMO detector 26 in the receiver 2 embodied herein, while the time interleavers 16 (16-1, 16-2) are disposed after the inter-polarization interleaver 15 in the transmitter 1 embodied herein. Therefore, it becomes possible to configure the receiver 2 that can repeatedly enforce demodulation and decode processing without increasing the scale of the processing circuits thereof.

Embodiment 2

Next, Embodiment 2 in which 1 data stream is transmitted by using a plurality of channels simultaneously (hereinafter, referred to as a "bulk transmission") will be detailed in the following. Concretely speaking, in the bulk transmission, a transmitter transmits OFDM signals of a plurality of channels through a plurality of transmit antennas per each channel, while a receiver receives the OFDM signals of the plurality of channels through a plurality of receive antennas per each channel. Although the number of channels is established at "2" in Embodiment 2, the number of channels is not limited to "2".

[Transmitter]

Figure 11:
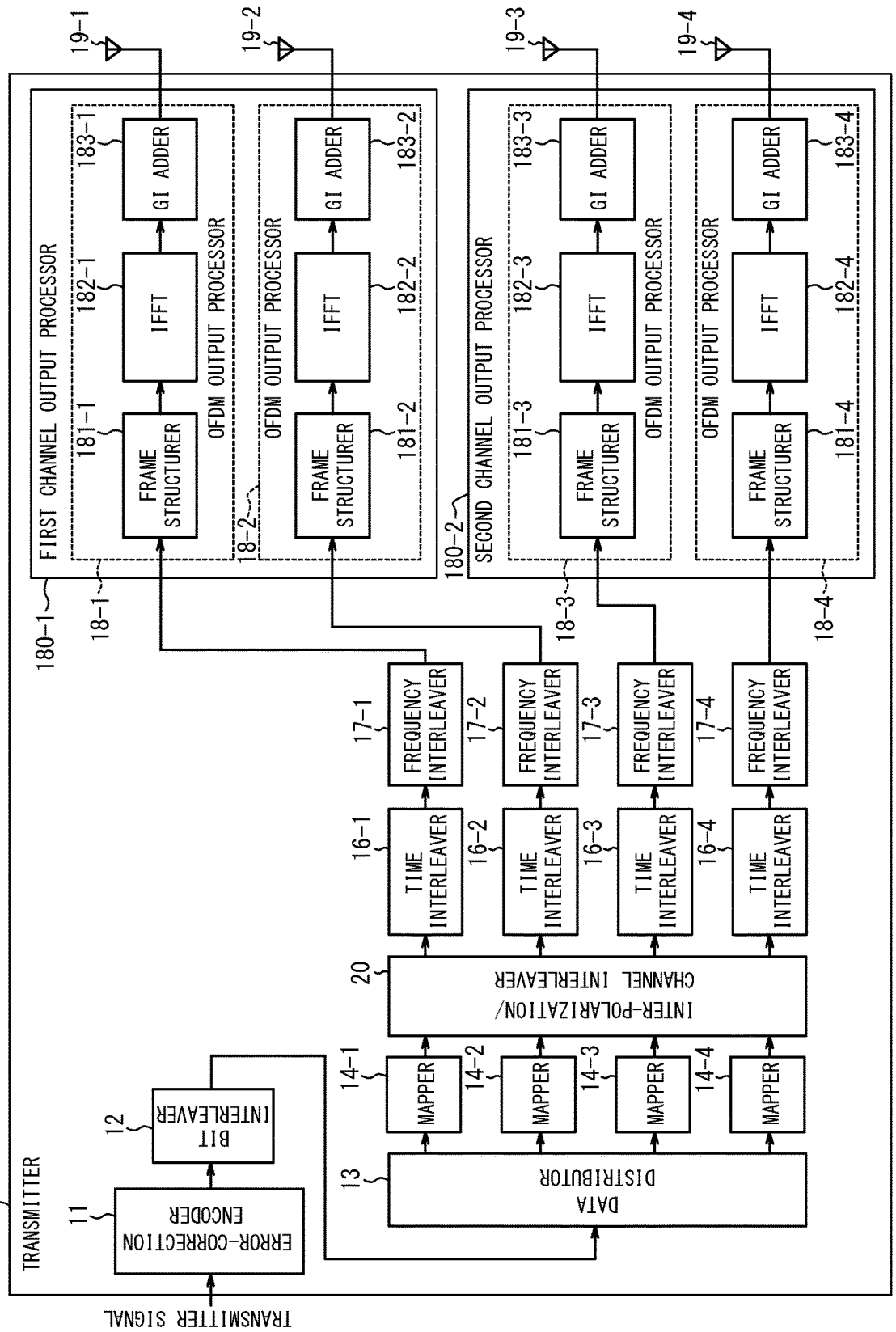
FIG. 11 is a block diagram illustrating a configuration of the disclosed transmitter in accordance with Embodiment 2.

FIG. 11 is a block diagram illustrating a configuration of a transmitter 3 in accordance with Embodiment 2. As illustrated in FIG. 11, the transmitter 3 includes an error-correction encoder 11, a bit interleaver 12, four mappers 14 (14-1, 14-2, 14-3, 14-4), an inter-polarization/channel interleaver 20, four time interleavers 16 (16-1, 16-2, 16-3, 16-4), four frequency interleavers 17 (17-1 to 17-4), a first channel output processor 180-1, and a second channel output processor 180-2. Further, four transmit antennas 19 (19-1, 19-2, 19-3, 19-4) are coupled to the transmitter 3. The transmitter 3 may include at least a semiconductor chip.

The error-correction encoder 11 and the bit interleaver 12 apply the same processing as those in Embodiment 1 to the transmitter signals for 2 channel.

Receiving the data from the bit interleaver 12, the data distributor 13 divides the data into four streams, and distributes the four streams to the mappers 14-1, 14-2, 14-3, 14-4, respectively. For instance, the received data may be distributed, with each data corresponding to a single carrier symbol. Concretely speaking, bits corresponding to odd-numbered carrier symbols are outputted to the mappers 14-1, 14-3, while other bits corresponding to even-numbered carrier symbols are outputted to the mappers 14-2, 14-4.

Receiving the data input from the data distributor 13, each of the mappers 14 (14-1, 14-2, 14-3, 14-4) maps the received data onto IQ plane as "m" bits/carrier-symbol to generate carrier symbols (herein, referred to as first carrier symbols) to which the carrier modulation according to the modulation scheme is applied, and outputs the first carrier symbols to the inter-polarization/channel interleaver 20.

Receiving the first carrier symbols input from the mappers 14-1, 14-2, 14-3, 14-4, the inter-polarization interleaver 15 rearranges an order of the first carrier symbols between polarizations (between the transmit antennas) and between the channels so as to generate interleaved data for each one of the transmit antennas 19-1, 19-2, 19-3, 19-4, and outputs the interleaved data (herein, referred to as second carrier symbols) to the time interleavers 16-1, 16-2, 16-3, 16-4. Further, the inter-polarization/channel interleaver 20 divides every predetermined number of the second carrier symbols into the first polarization transmission data of the first channel, the second polarization transmission data of the first channel, the first polarization transmission data of the second channel and the second polarization transmission data of the second channel. The concrete example of the inter-polarization/channel interleave processing will be detailed later.

Receiving the second carrier symbols from the inter-polarization/channel interleaver 20, the time interleavers 16 (16-1, 16-2, 16-3, 16-4) rearrange the order of the second carrier symbols in the time direction so as to generate time interleaved data, and output the time interleaved data (herein, referred to as third carrier symbols) to the frequency interleavers 17 (17-1, 17-2, 17-3, 17-4), respectively.

Receiving the third carrier symbols from the time interleavers 16-1, 16-2, 16-3, 16-4, the frequency interleavers 17 (17-1, 17-2, 17-3, 17-4) rearrange the order of the third carrier symbols in the frequency direction, so as to generate frequency interleaved data, and output the frequency interleaved data to the OFDM output processors 18 (18-1, 18-2, 18-3, 18-4), respectively. For instance, the interleave processing may be performed by using the method specified in the ISDB-T, and the interleaving in the frequency direction may be applied to every 1 OFDM symbol.

Receiving the streams from the frequency interleavers 17 (17-1, 17-2, 17-3, 17-4), the OFDM output processors 18 (18-1, 18-2, 18-3, 18-4) applies the OFDM frame configuration processing, the IFFT processing and the GI addition processing to the received streams, respectively. Then, the transmitter 3 transmits the OFDM signals of the first channel through the transmit antennas 19-1, 19-2, and also transmits the other OFDM signals of the second channel through the transmit antennas 19-3, 19-4.

[Receiver]

Figure 12:
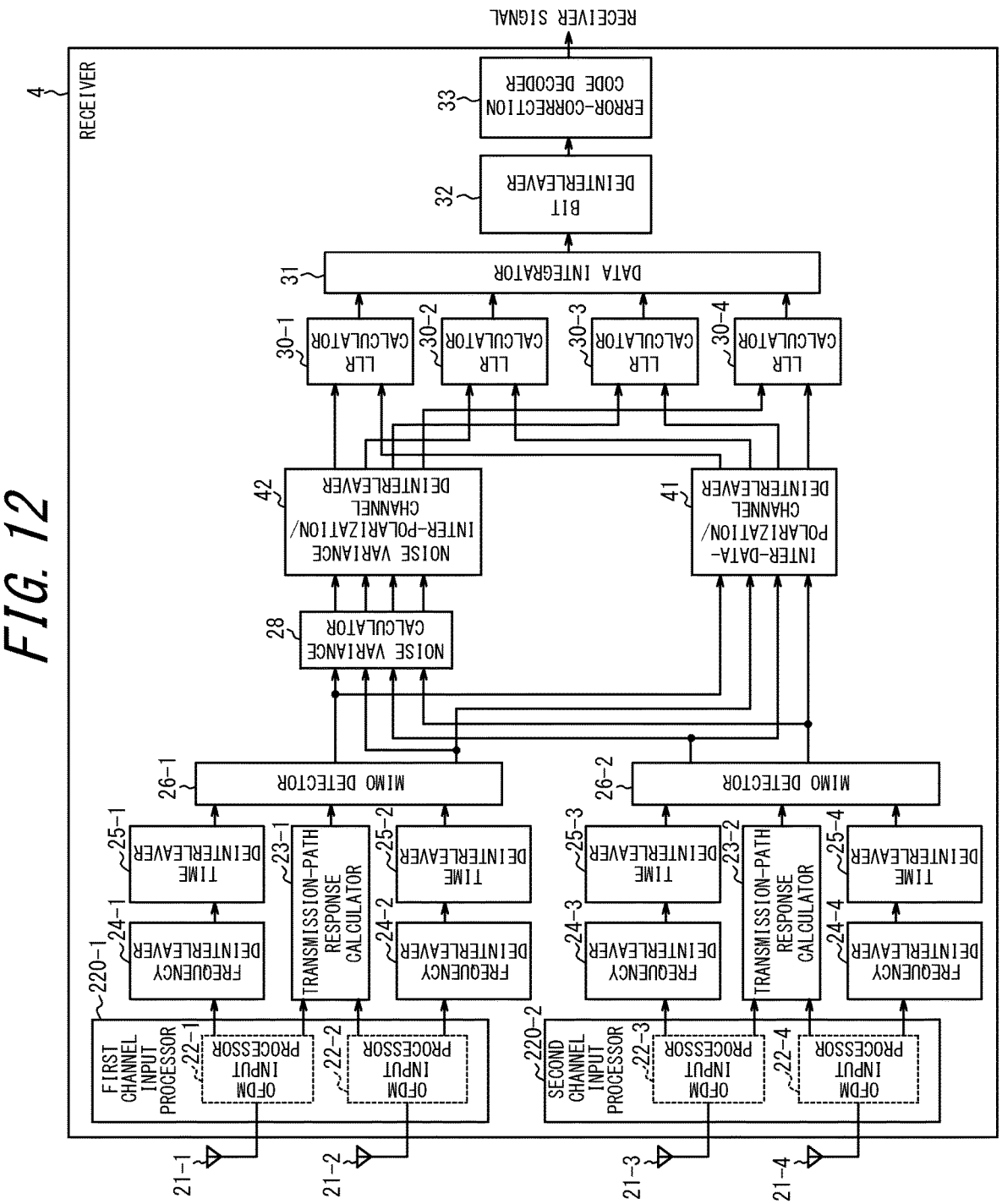
FIG. 12 is a block diagram illustrating a configuration of the disclosed receiver in accordance with Embodiment 2.

Next, a receiver in accordance with Embodiment 2 of the disclosure will be detailed in the following. FIG. 12 is a block diagram illustrating a configuration of a receiver 4 in accordance with Embodiment 2. As illustrated in FIG. 12, the receiver 4 includes a first channel input processor 220-1, a second channel input processor 220-2, two transmission-path response calculators 23 (23-1 and 23-2), four frequency deinterleavers 24 (24-1, 24-2, 24-3, 24-4), four time deinterleavers 25 (25-1, 25-2, 25-3, 25-4), two MIMO detectors 26 (26-1, 26-2), a data inter-polarization/channel deinterleaver 41, a noise variance calculator 28, a noise variance inter-polarization/channel deinterleaver 42, four LLR calculators 30 (30-1, 30-2, 30-3, 30-4), a data integrator 31, a bit deinterleaver 32 and an error-correction code decoder 33. Further, four receive antennas 21 (21-1, 21-2, 21-3, 21-4) are coupled to the receiver 4. The receiver 4 may include at least a semiconductor chip.

Through the receive antennas 21-1, 21-2, the receiver 4 receives the first channel OFDM signals transmitted from the transmit antennas 19-1, 19-2 of the transmitter 3, respectively. While, through the receive antennas 21-3, 21-4, the receiver 4 receives the second channel OFDM signals transmitted from the transmit antennas 19-3, 19-4 of the transmitter 3, respectively. Namely, the combination of the transmitter 3 and the receiver 4 achieves the 2×2 MIMO transmission corresponding to the number of channels.

In the same way as in Embodiment 1, the input processors 22 (22-1, 22-2, 22-3, 22-4) apply the GI removing processing, the FFT processing and the pilot signal extraction processing to the OFDM signals received through the receive antennas 21 (21-1, 21-2, 21-3, 21-4), respectively.

With respect to the reception signals processed by the first channel input processor 220-1, the transmission-path response calculator 23-1, the frequency deinterleavers 24-1, 24-2, the time deinterleavers 25-1, 25-2 and the MIMO detector 26-1 apply the processing same as those applied in Embodiment 1. Further, with respect to the reception signals processed by the second-channel input processor 220-2, the transmission-path response calculator 23-2, the frequency deinterleavers 24-3, 24-4, the time deinterleavers 25-3, 25-4 and the MIMO detector 26-2 apply the processing same as those applied in Embodiment 1.

Receiving the data from the MIMO detectors 26 (26-1, 26-2), the data inter-polarization/channel deinterleaver 41 applies deinterleave processing to the data between the polarizations and between the channels, and outputs the deinterleaved data to the LLR calculators 30 (30-1, 30-2, 30-3, 30-4). Incidentally, the data inter-polarization/channel deinterleave processing is such an operation for reconstructing the original order of the data from the rearranged order of the data interleaved between the polarizations and between the channels by the inter-polarization/channel interleaver 20 provided in the transmitter 3.

The noise variance calculator 28 calculates an average noise variance from each of the polarization signals received from the MIMO detectors 26 (26-1, 26-2), and outputs the average noise variance to the noise variance inter-polarization/channel deinterleaver 42.

Receiving the noise variance corresponding to each of the polarization signals input from the noise variance calculator 28, the noise variance inter-polarization/channel deinterleaver 42 applies deinterleave processing to the noise variance above-received and outputs the deinterleaved noise variance to the LLR calculators 30-1, 30-2, 30-3, 30-4. Further, with respect to the reception signals corresponding to the two channels, the LLR calculators 30 (30-1, 30-2, 30-3, 30-4), the data integrator 31, the bit deinterleaver 32 and the error-correction code decoder 33 apply the processing same as those applied in Embodiment 1.

[Inter-Polarization/Channel Interleaver]

Next, the processing to be performed by the inter-polarization/channel interleaver 20 will be detailed in the following. As well as Embodiment 1, Examples 1 to 4 of interleave processing will be detailed in Embodiment 2.

Example 1 of Inter-Polarization/Channel Interleave Processing

Figures 13A, 13B, 13C:
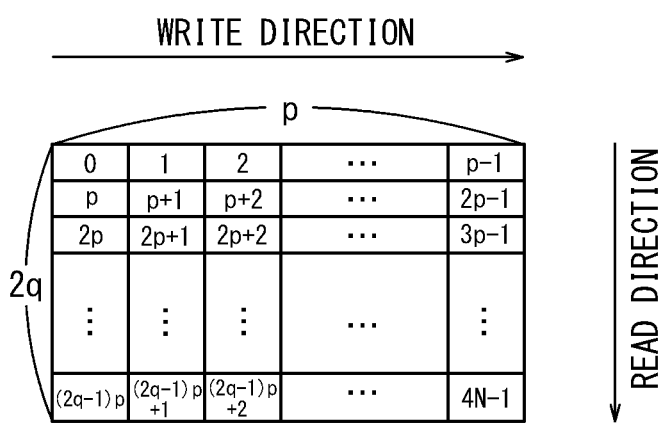
FIGS. 13A, 13B, and 13C are explanatory schematic diagrams exemplifying a first processing to be performed in an inter-polarization/channel interleaver provided in the disclosed transmitter in accordance with Embodiment 2 disclosed herein.

FIGS. 13A, 13B, 13C are explanatory schematic diagrams illustrating Example 1 of the interleave processing to be performed in the inter-polarization/channel interleaver 20. In Example 1, for every one of OFDM carrier symbols corresponding to the number of transmit antennas, the order of carrier symbols is rearranged on a carrier symbol basis according to the predetermined rule. Assuming that the number of carrier symbols included in 1 OFDM carrier symbol is "N", the inter-polarization/channel interleaver 20 receives four sets of carrier symbols input from the mappers 14-1, 14-2, 14-3, 14-4, respectively, the carrier symbols respectively having the carrier symbol numbers of "0" through "N−1", "N" through "2N−1", "2N" through "3N−1" and "3N" through "4N−1". In Example 1, the inter-polarization/channel interleaver 20 writes every one line having "p" pieces of carrier symbols in the line direction, and after that, reads every one column of carrier symbols having "2q" pieces of carrier symbols in the column direction. Wherein, p×2q=4N is established.

As well as the above, with respect to the OFDM carrier symbols corresponding to the number of transmit antennas, the inter-polarization/channel interleaver 20 may be provided in advance with a table (regulatory table) in which the positions of carrier symbols before the rearrangement are correlated to those after the rearrangement, according to a predetermined rule. In that case, the inter-polarization/channel interleaver 20 receives four sets of carrier symbols input from the mappers 14-1, 14-2, 14-3, 14-4, respectively, the carrier symbols respectively having the carrier symbol numbers of "0" through "N−1", "N" through "2N−1", "2N" through "3N−1" and "3N" through "4N−1". Then, referring to the regulatory table, the inter-polarization/channel interleaver 20 rearranges the received carrier symbols for every unit of "2N" carrier symbols.

Example 2 of Inter-Polarization/Channel Interleave Processing

Figure 14A:
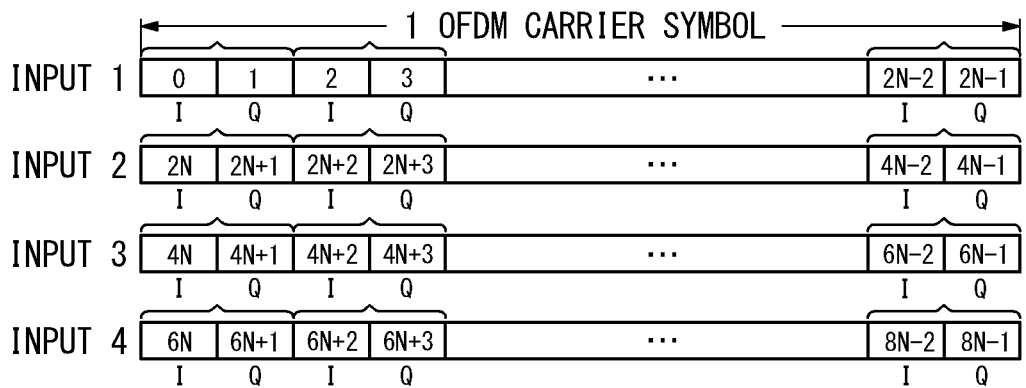
FIGS. 14A, 14B, and 14C are explanatory schematic diagrams exemplifying a second processing to be performed in an inter-polarization interleaver provided in the disclosed a transmitter in accordance with Embodiment 2 disclosed herein.
Figure 14B:
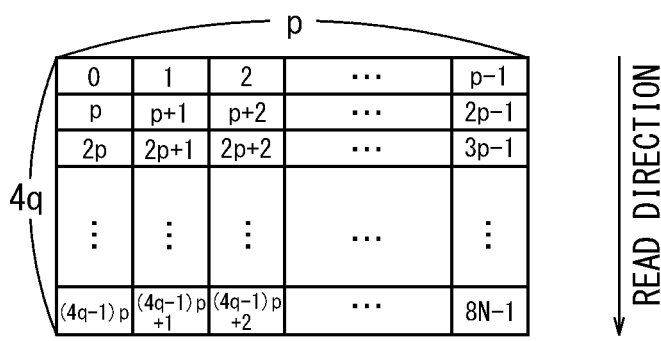
Figure 14C:
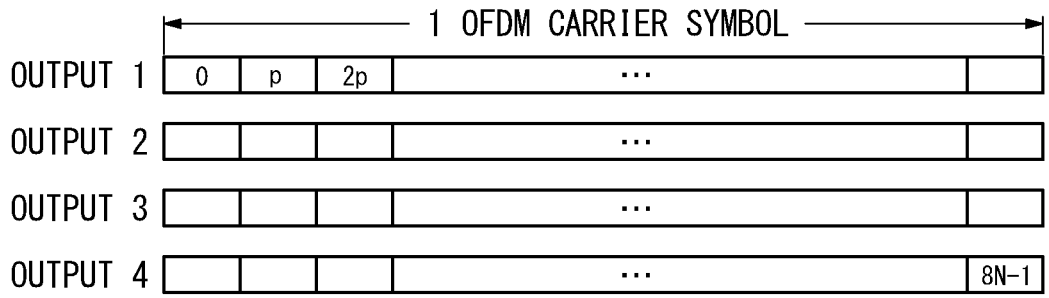
Figure 15:
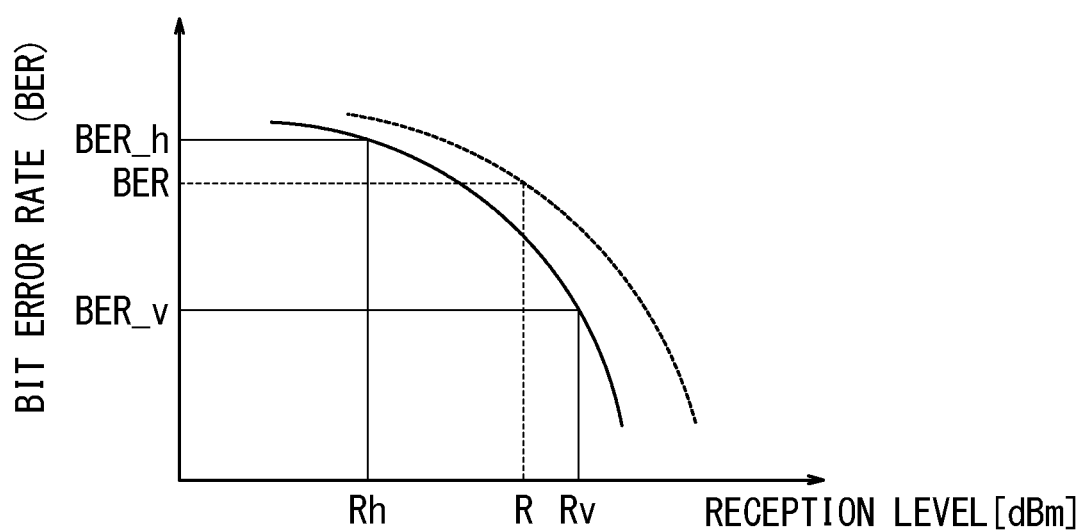
FIG. 15 is a graph illustrating a deterioration of a bit error rate, caused by a difference between reception levels.

Successively, Example 2 of the inter-polarization/channel interleave processing will be detailed in the following. FIGS. 14A, 14B, 14C are explanatory schematic diagrams illustrating Example 2 of inter-polarization/channel interleave processing to be performed in the inter-polarization/channel interleaver 20. As aforementioned, in Example 1, for every one of OFDM carrier symbols corresponding to the number of transmit antennas, the order of carrier symbols is rearranged on a carrier symbol basis according to the predetermined rule. Whereas, in Example 2, for every one of OFDM carrier symbols corresponding to the number of transmit antennas, the order of carrier symbols is rearranged in units of I data to be positioned on the I coordinate axis of the IQ plane and in units of Q data to be positioned on the Q coordinate axis of the IQ plane according to the predetermined rule.

Concretely speaking, in Example 2, assuming that the number of carrier symbols is "N", the inter-polarization/channel interleaver 20 receives four sets of carrier symbols input from the mappers 14-1, 14-2, 14-3, 14-4, respectively, the carrier symbols respectively having the carrier symbol numbers of "0" through "N−1", "N" through "2N−1", "2N" through "3N−1" and "3N" through "4N−1". Then, the inter-polarization/channel interleaver 20 respectively decomposes the four sets of carrier symbols into four sets of pairs of I data and Q data, so as to create four sets of IQ data respectively having the data numbers of "0" through "2N−1", "2N" through "4N−1", "4N" through "6N−1" and "6N" through "8N−1", which are corresponding to the four sets of carrier symbols respectively having the carrier symbol numbers of "0" through "N−1", "N" through "2N−1", "2N" through "3N−1" and "3N" through "4N−1", respectively. Successively, the inter-polarization/channel interleaver 20 writes every one line having "p" pieces of IQ data in the line direction, and after that, reads every one column of IQ data having "4q" pieces of carrier symbols in the column direction. After interleaving, new carrier symbols (pairs of the I data and the Q data) are created. Wherein, p×4q=8N is established.

In the same way, with respect to the OFDM carrier symbols corresponding to the number of transmit antennas, the inter-polarization/channel interleaver 20 may be provided in advance with a table (regulatory table) in which the positions of IQ data before the rearrangement are correlated to those after the rearrangement, according to a predetermined rule. In that case, the inter-polarization/channel interleaver 20 receives four sets of carrier symbols input from the mappers 14-1, 14-2, 14-3, 14-4, respectively, the carrier symbols respectively having the carrier symbol numbers of "0" through "N−1", "N" through "2N−1", "2N" through "3N−1" and "3N" through "4N−1". Then, the inter-polarization/channel interleaver 20 respectively decomposes the four sets of carrier symbols into four sets of pairs of I data and Q data, so as to create four sets of IQ data respectively having the data numbers of "0" through "2N−1", "2N" through "4N−1", "4N" through "6N−1" and "6N" through "8N−1", which are corresponding to the four sets of carrier symbols respectively having the carrier symbol numbers of "0" through "N−1", "N" through "2N−1", "2N" through "3N−1" and "3N" through "4N−1", respectively. Then, referring to the regulatory table, the inter-polarization/channel interleaver 20 rearranges the created IQ data for every total "8N" IQ data.

Example 3 of Inter-Polarization/Channel Interleave Processing

Still successively, Example 3 of inter-polarization/channel interleave processing will be detailed as follows. In Example 3, with respect to the OFDM carrier symbols corresponding to the number of transmit antennas, inter-polarization/channel interleaver 20 is provided in advance with a table (randomization table) in which the positions of carrier symbols before the rearrangement are randomly correlated to those after the rearrangement. Further, the inter-polarization/channel interleaver 20 receives carrier symbols input from the mappers 14-1, 14-2, 14-3, 14-4, respectively, the carrier symbols respectively having the carrier symbol numbers of "0" through "N−1", "N" through "2N−1", "2N" through "3N−1" and "3N" through "4N−1". Then, referring to the randomization table, the inter-polarization/channel interleaver 20 rearranges the received carrier symbols for every total "4N" carrier symbols.

Example 4 of Inter-Polarization/Channel Interleave Processing

Yet successively, Example 4 of inter-polarization/channel interleave processing is detailed as follows. As aforementioned, in Example 3, for every one of OFDM carrier symbols corresponding to the number of transmit antennas, the order of carrier symbols is randomly rearranged on a carrier symbol basis. Whereas, in Example 4, for every one of OFDM carrier symbols corresponding to the number of transmit antennas, the order of carrier symbols is randomly rearranged in units of IQ data.

Concretely speaking, in Example 4, with respect to the OFDM carrier symbols corresponding to the number of transmit antennas, the inter-polarization/channel interleaver 20 is provided in advance with a table (randomization table) in which the positions of IQ data before the rearrangement are randomly correlated to those after the rearrangement. The inter-polarization/channel interleaver 20 receives four sets of carrier symbols input from the mappers 14-1, 14-2, 14-3, 14-4, respectively, the carrier symbols respectively having the carrier symbol numbers of "0" through "N−1", "N" through "2N−1", "2N" through "3N−1" and "3N" through "4N−1". Then, the inter-polarization/channel interleaver 20 respectively decomposes the four sets of carrier symbols into four sets of pairs of I data and Q data, so as to create four sets of IQ data respectively having the data numbers of "0" through "2N−1", "2N" through "4N−1", "4N" through "6N−1" and "6N" through "8N−1", which are corresponding to the four sets of carrier symbols respectively having the carrier symbol numbers of "0" through "N−1", "N" through "2N−1", "2N" through "3N−1" and "3N" through "4N−1", respectively. Successively, referring to the randomization table, the inter-polarization/channel interleaver 20 rearranges the created IQ data for every total "8N" IQ data. After interleaving, new carrier symbols (pairs of I data and Q data) are created.

Further, in the aforementioned examples of the inter-polarization/channel interleave processing, the inter-polarization/channel interleaver 20 rearranges carrier symbols or IQ data in units of a carrier symbol or IQ data for each one of OFDM carrier symbols corresponding to the number of transmit antennas. However, the inter-polarization/channel interleaver 20 may rearrange carrier symbols or IQ data in units of a carrier symbol or IQ data for every one of any numbers of carrier symbols.

Still further, in Example 2 or 4 aforementioned, when rearranging the carrier symbols in units of IQ data, the inter-polarization interleaver 15 may rearrange only one of I data and Q data.

On the other hand, the data inter-polarization/channel deinterleaver 41 rearranges the data MIMO-separated by the MIMO detector 26 in the direction reverse to that of the inter-polarization/channel interleaver 20 so as to reconstruct the original order of the data. For instance, in the case where the inter-polarization/channel interleaver 20 applies the interleave processing described in Example 1 aforementioned, the data inter-polarization/channel deinterleaver 41 writes every one line having "2q" units of data in the line direction, and after that, reads every one column of the data having "p" units of data in the column direction. While, in the case where the inter-polarization/channel interleaver 20 applies the interleave processing described in Example 2 aforementioned, the data inter-polarization/channel deinterleaver 41 writes every one line having "4q" units of data in the line direction, and after that, reads every one column of the data having "p" units of data in the column direction. Further, in the case where the inter-polarization/channel interleaver 20 applies the interleave processing while using any one of the tables (regulatory table or randomization table), the data inter-polarization/channel deinterleaver 41 implements the rearrangement processing, while referring to a table in which the positions of the carrier symbols are established by switching the positions before and after the rearrangement.

Further, in the case where the data inter-polarization/channel deinterleaver 41 rearranges only one of the I data and the Q data in Example 2 or 4 aforementioned, the data inter-polarization/channel deinterleaver 41 rearranges only corresponding one of the odd numbered data and the even numbered data.

Still further, in the case where the inter-polarization/channel interleaver 20 performs the inter-polarization interleave processing according to Embodiment 2 or 4 aforementioned, the data inter-polarization/channel deinterleaver 41 applies the inter-polarization/channel interleave processing to the MIMO-separated data received from the MIMO detector 26, and thereafter, generates carrier symbols as I data and Q data, which are adjacent to each other and respectively arranged on the I coordinate axis and the Q coordinate axis on the IQ plane.

Yet further, as well as the data inter-polarization/channel deinterleaver 41, the noise variance inter-polarization/channel deinterleaver 42 rearranges the noise variance received from the noise variance calculator 28 in a direction reverse to that in the inter-polarization/channel interleaver 20.

As described in the foregoing, the transmitter 3 employs the inter-polarization/channel interleaver 20 to rearrange the order of the carrier symbols between the polarizations and between the channels, so as to generate the interleaved data for every one of the transmit antennas 19 (19-1, 19-2, 19-3, 19-4). While, the receiver 4 employs the data inter-polarization/channel deinterleaver 41 and the noise variance inter-polarization/channel deinterleaver 42 to apply the data inter-polarization/channel deinterleave processing to the interleaved data corresponding to the number of channels and received from the transmitter 3. Therefore, as well as Embodiment 1, according to a combination of the transmitter 3 and the receiver 4 in accordance with Embodiment 2, even in a case where reception level differences between a plurality of polarizations exist when the bulk transmission is enforced by employing a plurality of channels, a lot of erroneous data included in any one of the polarizations can be dispersed effectively. In addition, even in a case where co-channel interference occurs only at one of the channels, the data included in the concerned channel that includes a lot of erroneous data can be dispersed effectively. Accordingly, it becomes possible to heighten the performance of the error correction code, resulting in an improvement of the BER characteristic.

Further, the time deinterleavers 25 (25-1, 25-2, 25-3, 25-4) are disposed before the MIMO detector 26 in the receiver 4 embodied herein, while the time interleavers 16 (16-1, 16-2, 16-3, 16-4) are disposed after the inter-polarization/channel interleaver 20 in the transmitter 3 embodied herein. Therefore, it becomes possible to configure the receiver 4 that can repeatedly enforce demodulation and decode processing, without increasing the scale of the processing circuits thereof.

In the foregoing, Embodiments of the disclosure have been described by way of typical examples. It is apparent for persons skilled in the art that the disclosed Embodiments can be varied or replaced in/with a wide variety of modifications by a skilled person without departing from the spirit and scope of the disclosure. Therefore, the scope of the disclosure is not limited to Embodiments above. Any kinds of modifications and/or alterations made by a skilled person without departing from the spirit and scope of the disclosure shall be included in the scope of the disclosure.

For instance, in the aforementioned Embodiments, the error-correction encoder 11 of the transmitter 1 employs the LDPC code as the inner correction code. However, in a case where the LDPC code is not employed as the inner correction code, the receiver 2 may be not provided with the noise variance calculator 28, the noise variance inter-polarization deinterleaver 29 and the LLR calculators 30 (30-1, 30-2). Further, in the aforementioned Embodiments, the explanations has been given to only such the case that the transmitter and the receiver are applied for the 2×2 MIMO transmission. However, needless to say, the transmitter and the receiver can be also applied for the 2×4 MIMO transmission, or the 4×4 MIMO transmission.

INDUSTRIAL APPLICABILITY

As described in the foregoing, the present disclosure is useful for the MIMO system with the SDM-MIMO transmission.

REFERENCE SIGNS LIST 1, 3 transmitter
2, 4 receiver
11 error-correction encoder
12 bit interleaver
13 data distributor (antenna stream multiplexer)
14-1, 14-2 mapper
15 inter-polarization interleaver (MIMO precoder)
16-1, 16-2, 16-3, 16-4 time interleaver
17-1, 17-2, 17-3, 17-4 frequency interleaver
18-1, 18-2, 18-3, 18-4 OFDM output processor
19-1, 19-2, 19-3, 19-4 transmit antenna
20 inter-polarization/channel interleaver
21-1, 21-2, 21-3, 21-4 receive antenna
22-1, 22-2, 22-3, 22-4 OFDM input processor
23, 23-1, 23-1 transmission-path response calculator
24-1, 24-2, 24-3, 24-4 frequency deinterleaver
25-1, 25-2, 25-3, 25-4 time deinterleaver
26, 26-1, 26-2 MIMO detector
27 data inter-polarization deinterleaver
28 noise variance calculator
29 noise variance inter-polarization deinterleaver
30 LLR calculator
31 data integrator
32 bit deinterleaver
33 error-correction code decoder
41 data inter-polarization/channel deinterleaver
42 noise variance inter-polarization/channel deinterleaver
180-1 first channel output processor
180-2 second channel output processor
181-1, 181-2, 181-3, 181-4 OFDM frame structurer
182-1, 182-2, 182-3, 182-4 IFFT
183-1, 183-2, 183-3, 183-4 GI adder
220-1 first channel input processor
220-2 second channel input processor
221-1, 221-2, 221-3, 221-4 GI remover
222-1, 222-2, 222-3, 222-4 FFT
223-1, 223-2, 223-1, 223-2 pilot signal extractor

The invention claimed is:

1. A transmitter that generates OFDM signals to be transmitted through a plurality of transmit antennas, comprising:
    a data distributor that distributes data to each of the transmit antennas;
    a mapper that maps the data distributed by the data distributor, onto an IQ plane, to generate carrier-modulated carrier symbols;
    an inter-polarization interleaver that rearranges an order of the plurality of the carrier symbols between polarizations corresponding to the plurality of the transmit antennas to generate inter-polarization interleaved data for each of the plurality of the transmit antennas;
    a time interleaver that applies an interleave processing in a time direction to the inter-polarization interleaved data for each of the transmit antennas to generate time-interleaved data;
    wherein the inter-polarization interleaver decomposes the plurality of carrier symbols into I data and Q data, which are respectively arranged on the I coordinate axis and the Q coordinate axis on the IQ plane, and thereafter, rearranges the orders of the I data and the Q data between the transmit antennas according to a predetermined rule, in units of the I data and the Q data to generate the inter-polarization interleaved data; and
    an OFDM output processor that generates OFDM signals corresponding to the inter-polarization interleaved data.

2. The transmitter of claim 1, wherein the inter-polarization interleaver refers to a table indicating positions of the data before and after being rearranged, so as to generate the inter-polarization interleaved data.

3. A receiver that demodulates OFDM signals received through a plurality of receive antennas, comprising:
    an OFDM input processor that demodulates the OFDM signals to generate complex baseband signals;
    a time deinterleaver that applies a first deinterleave processing in a time direction to the complex baseband signals to generate time deinterleaved data;
    a MIMO detector that applies a MIMO separation processing to the time deinterleaved data to generate a plurality of sets of MIMO separated data;
    wherein the data inter-polarization deinterleaver rearranges the order of the plurality of sets of MIMO separated data received from the MIMO detector, between the plurality of receive antennas according to a predetermined rule, and thereafter, generates carrier symbols as I data and Q data, wherein the I data and the Q data are adjacent to each other and respectively arranged on the I coordinate axis and the Q coordinate axis on an IQ plane; and
    a data inter-polarization deinterleaver that rearranges an order of the plurality of sets of MIMO separated data between polarizations corresponding to the plurality of receive antennas to generate carrier symbols.

4. The receiver of claim 3, wherein the data inter-polarization interleaver refers to a table indicating positions of the data before and after being rearranged, so as to generate the carrier symbols.

5. A semiconductor chip that generates OFDM signals to be transmitted through a plurality of transmit antennas, comprising:
- a data distributor that distributes data to each of the transmit antennas;
- a mapper that maps, onto an IQ plane, the data distributed by the data distributor, and generates carrier-modulated carrier symbols;
- an inter-polarization interleaver that rearranges an order of the plurality of the carrier symbols between polarizations corresponding to the plurality of the transmit antennas to generate inter-polarization interleaved data for each of the plurality of the transmit antennas;
- a time interleaver that applies an interleave processing in a time direction to the inter-polarization interleaved data for each of the transmit antennas to generate time interleaved data;
- wherein the inter-polarization interleaver decomposes the plurality of the carrier symbols into I data and Q data, which are respectively arranged on the I coordinate axis and the Q coordinate axis on the IQ plane, and thereafter, rearranges the orders of the I data and the Q data between the transmit antennas in of the I data and the Q data to generate the inter-polarization interleaved data; and
- an OFDM output processor that generates OFDM signals corresponding to the inter-polarization interleaved data.

6. A semiconductor chip that demodulates OFDM signals received through a plurality of receive antennas, comprising:
- an OFDM input processor that demodulates the OFDM signals to generate complex baseband signals;
- a time deinterleaver that applies a first deinterleave processing in a time direction to the complex baseband signals so as to generate time deinterleaved data;
- a MIMO detector that applies a MIMO separation processing to the time deinterleaved data so as to generate a plurality of sets of MIMO separated data;
- a data inter-polarization deinterleaver that rearranges an order of the plurality of sets of MIMO separated data between polarizations corresponding to the plurality of receive antennas to generate carrier symbols;
- wherein the data inter-polarization deinterleaver rearranges the order of the plurality of sets of MIMO separated data received from the MIMO detector, between the plurality of receive antennas according to a predetermined rule, and thereafter, generates the carrier symbols as I data and Q data, wherein the I data and the Q data are adjacent to each other and respectively arranged on the I coordinate axis and the Q coordinate axis on an IQ plane.

7. The transmitter of claim 1, further comprising a bit interleaver that interleaves transmitter signals in units of bit, wherein the data distributed by the data distributor is input from the bit interleaver.

* * * * *